United States Patent
Ohsaki et al.

(10) Patent No.: US 7,304,698 B2
(45) Date of Patent: Dec. 4, 2007

(54) COLOR FILTER SUBSTRATE HAVING DUMMY COLOR FILTER IN NON-EFFECTIVE DISPLAY AREA, AND DISPLAY DEVICE INCLUDING THE SAME

(75) Inventors: Morihide Ohsaki, Tsu (JP); Toshihide Tsubata, Matsusaka (JP); Tsuyoshi Tokuda, Matsusaka (JP); Yoshinori Shimada, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 565 days.

(21) Appl. No.: 10/740,861

(22) Filed: Dec. 22, 2003

(65) Prior Publication Data

US 2004/0130253 A1    Jul. 8, 2004

(30) Foreign Application Priority Data

| Dec. 27, 2002 | (JP) | ............................. 2002-381210 |
| Jan. 28, 2003 | (JP) | ............................. 2003-018932 |
| Nov. 13, 2003 | (JP) | ............................. 2003-384206 |

(51) Int. Cl.
*G02F 1/1335* (2006.01)

(52) U.S. Cl. .......................... 349/106; 349/110; 430/7; 257/435; 257/72; 257/492.2

(58) Field of Classification Search ................ 349/106; 250/492.2; 430/7; 257/435, 72
See application file for complete search history.

(56) References Cited

U.S. PATENT DOCUMENTS 6,509,571 B2* 1/2003 Suzuki .................... 250/492.2

| 2003/0117549 A1* | 6/2003 | Yi et al. ..................... 349/106 |
| 2003/0128309 A1* | 7/2003 | Yamada ..................... 349/106 |
| 2003/0160914 A1* | 8/2003 | Ha .............................. 349/106 |
| 2004/0239838 A1* | 12/2004 | Lai ............................ 349/106 |

FOREIGN PATENT DOCUMENTS

| JP | 11-119207 | 4/1999 |
| JP | 11-133406 | 5/1999 |

(Continued)

OTHER PUBLICATIONS

Official Communication dated Oct. 21, 2005, issued in the corresponding Korean Patent Application No. 10-2003-97850. (With full English translation).

*Primary Examiner*—Huyen Ngo
(74) *Attorney, Agent, or Firm*—Keating & Bennett, LLP

(57) ABSTRACT

A color filter substrate includes a transparent substrate with first and second opposed edges, a color filter layer including color filters of first, second and third types extending in a first direction with the third type interposed between the first and second types, and an opaque layer including opaque portions extending in the first direction and another opaque portion connected to the other opaque portions along the second edge. The color filter substrate is fabricated by (a) forming the opaque layer on the transparent substrate, and then (b) forming the color filter layer thereon. The step (a) includes forming an opening in a non-effective display area of the color filter substrate between one end of each color filter of the third type and the second edge. The step (b) includes attaching and rolling a dry film in the first direction on the transparent substrate after the color filters of the first and second types have been provided thereon.

11 Claims, 14 Drawing Sheets

FOREIGN PATENT DOCUMENTS

| | | |
|---|---|---|
| JP | 2001-100221 | 4/2001 |
| JP | 2001-296523 | 10/2001 |
| JP | 2002-071927 | 3/2002 |
| JP | 2002-071929 | 3/2002 |
| JP | 2002-286927 | 10/2002 |

* cited by examiner

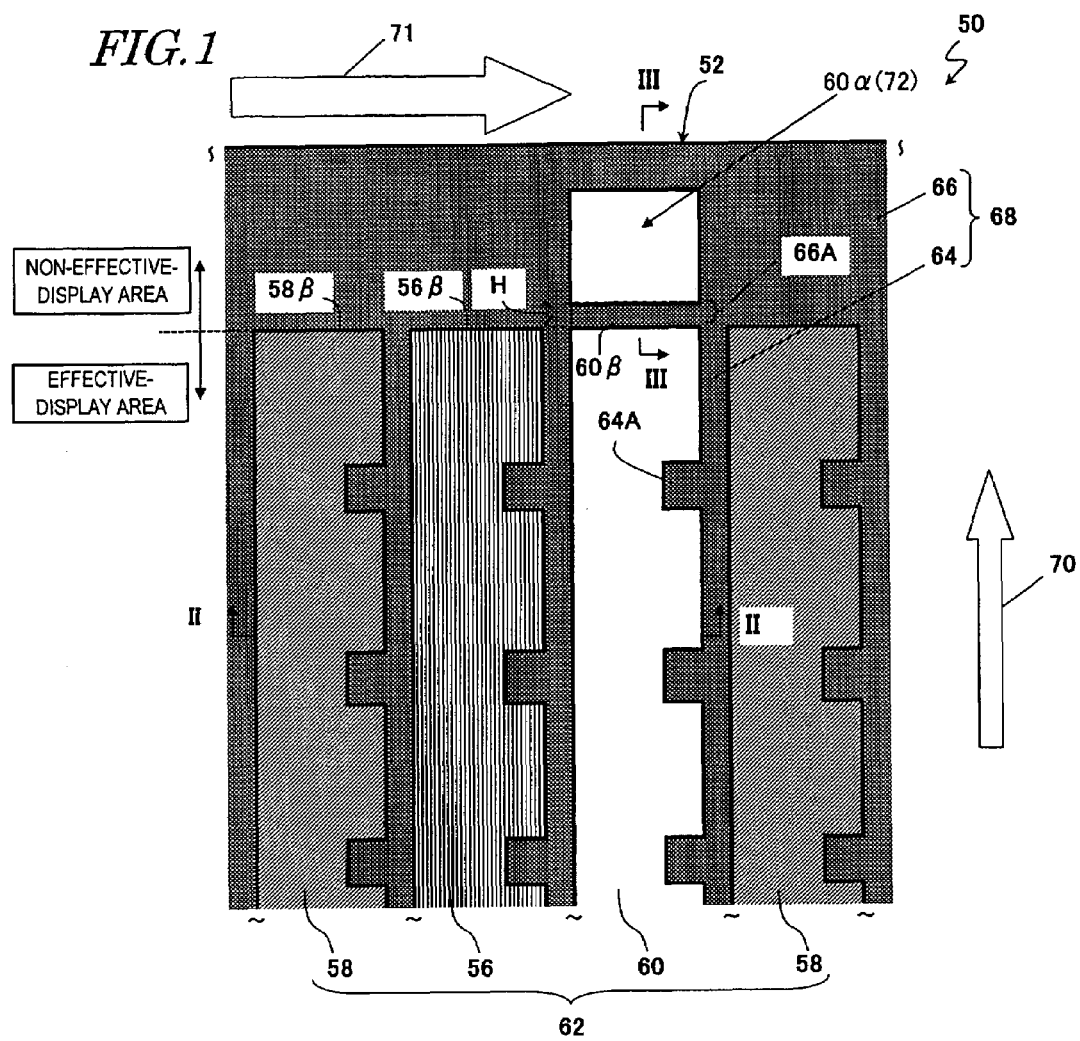

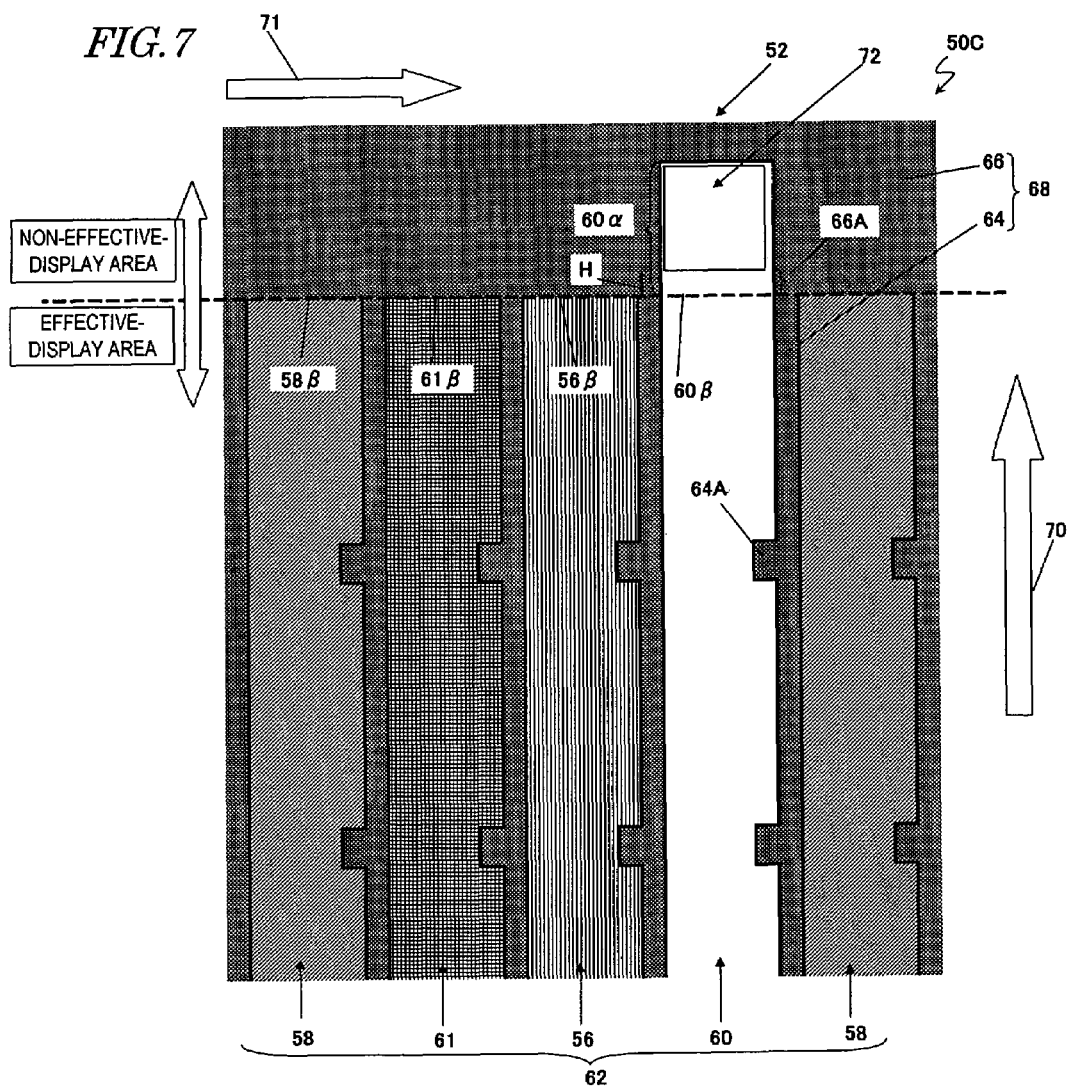

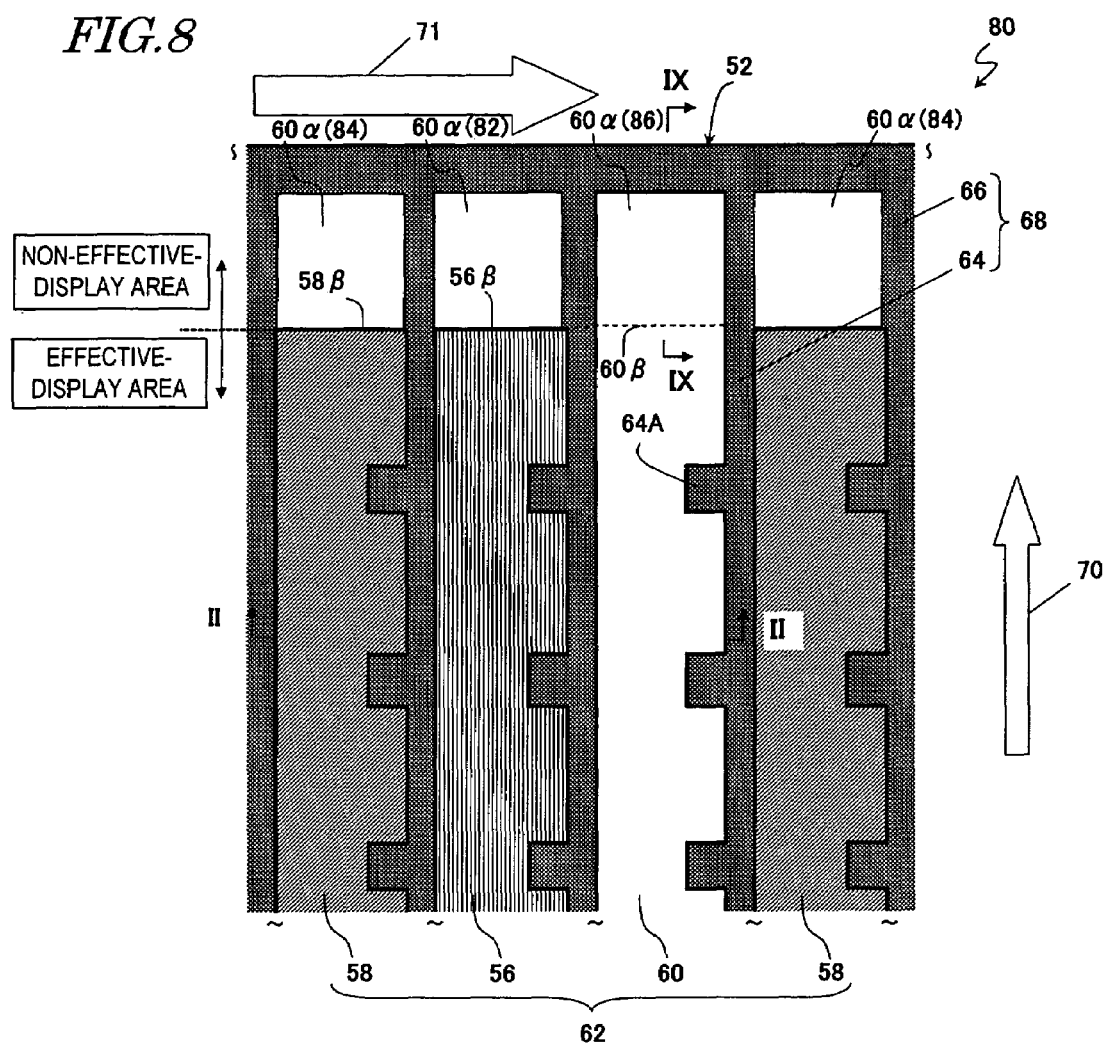

FIG. 14A PRIOR ART
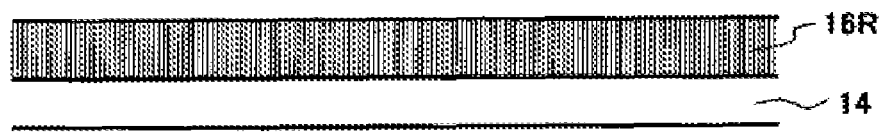
FIG. 14B PRIOR ART
FIG. 14C PRIOR ART
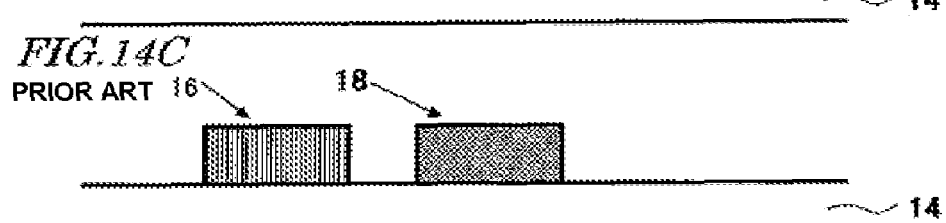
FIG. 14D PRIOR ART
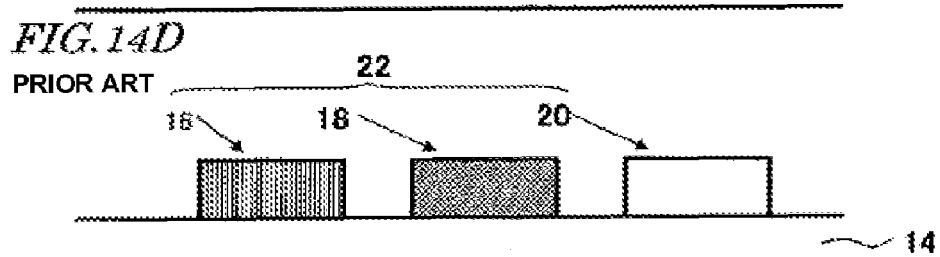
FIG. 14E PRIOR ART
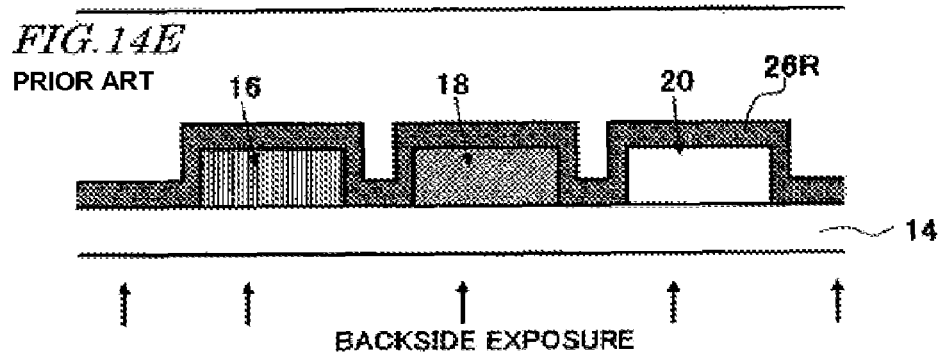
BACKSIDE EXPOSURE
FIG. 14F PRIOR ART
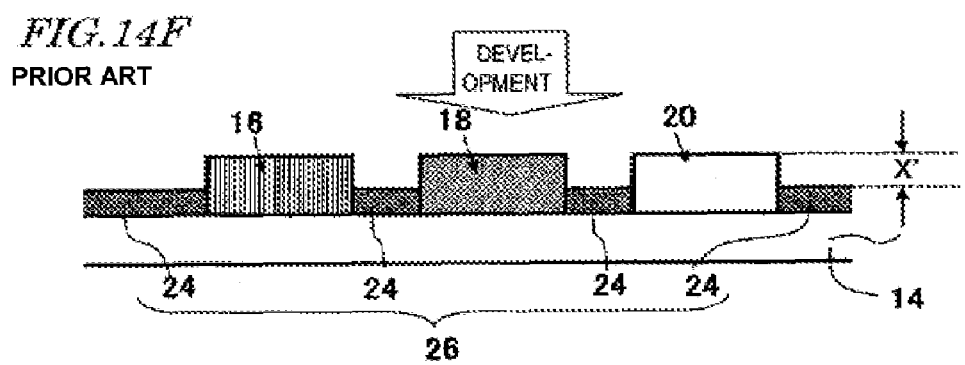

COLOR FILTER SUBSTRATE HAVING DUMMY COLOR FILTER IN NON-EFFECTIVE DISPLAY AREA, AND DISPLAY DEVICE INCLUDING THE SAME

BACKGROUND OF THE INVENTION

1. Field of the Invention

The present invention relates to a method for fabricating a color filter substrate for use in a color liquid crystal display (LCD) and other display devices.

2. Description of the Related Art

LCDs are relatively small, thin and lightweight display devices with comparatively low power dissipation. By taking advantage of these features, LCDs are currently used extensively in a broad variety of electronic appliances. Among other things, active-matrix-addressed LCDs with switching elements are used particularly widely in office automation (OA) appliances such as personal computers, audiovisual (AV) appliances such as TV sets, and cell phones. Meanwhile, the size, definition, effective pixel area ratio (i.e., aperture ratio), color purity and other quality parameters of LCDs have recently been increased or improved significantly.

The structure of a normal active-matrix-addressed LCD will be described with reference to FIG. 13, which is a cross-sectional view thereof.

As shown in FIG. 13, the LCD 30 includes an active-matrix substrate 2 and a color filter substrate 4, which are arranged so as to face each other, and a liquid crystal layer 6 provided between these two substrates 2 and 4. Also, as viewed perpendicularly to the principal surface of any of these substrates, the LCD 30 has an effective display area and a picture frame area that surrounds the effective display area.

The active-matrix substrate 2 includes a transparent insulating substrate 8 made of glass, for example, gate bus lines (not shown) to supply gate signals therethrough, source bus lines 10 to supply data signals therethrough, active components (not shown) such as thin-film transistors (TFTs) and transparent pixel electrodes 12. The gate bus lines, source bus lines 10, active components and pixel electrodes 12 are all provided on the substrate 8. The transparent pixel electrodes 12 are arranged in a matrix on the display area.

The color filter substrate 4 includes a transparent insulating substrate 14 made of glass, for example, a color filter layer 22 consisting of red color filters 16, green color filters 18 and blue color filters 20, an opaque layer 26 including a plurality of opaque portions 24, and a counter electrode (not shown). The color filter layer 22, opaque layer 26 and counter electrode are all provided on the substrate 14. The red, green and blue color filters 16, 18 and 20 are arranged so as to face their associated transparent pixel electrodes 12 on the active matrix substrate 2. The opaque layer 26 is arranged such that the opaque portions 24 are disposed in the gaps between the respective color filters and in the picture frame area.

Next, a conventional method for fabricating the color filter substrate 4 will be described.

Recently, a dry film process is often adopted as a method for fabricating such a color filter substrate. Hereinafter, a method for fabricating a color filter substrate by the dry film process will be described with reference to FIGS. 14A through 14F (see Japanese Laid-Open Publication No. 2001-100221, for example).

A dry film is a photosensitive resin layer, which is normally sandwiched between two film supporting members of polyethylene terephthalate (PET) films, for example. The photosensitive resin layer is one of four types of dry films, in which a red, green, blue or black pigment is dispersed, and is typically negative.

Specifically, first, a red dry film is attached onto, and rolled on, the glass substrate 14 and then its film supporting members are peeled off, thereby transferring a red photosensitive resin layer 16R onto the substrate 14 as shown in FIG. 14A. This process step is normally carried out with the dry film heated, i.e., a so-called "thermal transfer process". Next, the red photosensitive resin layer 16R thus transferred is exposed to radiation through a mask 32 and then developed, thereby making red color filters 16 as shown in FIG. 14B.

Next, a similar process step is carried out on a green dry film to form green color filters 18 as shown in FIG. 14C. Furthermore, a similar process step is carried out on a blue dry film to form blue color filters 20 as shown in FIG. 14D. In this manner, a color filter layer 22, consisting of the red, green and blue color filters 16, 18 and 20, is obtained.

Thereafter, as in making the color filter layer 22, a black dry film is attached onto, and rolled on, the glass substrate 14, thereby transferring a black photosensitive resin layer 26R onto the substrate 14 as shown in FIG. 14E. Then, the black photosensitive resin layer 26R is exposed to a radiation that has come from under the back surface of the glass substrate 14 (i.e., a backside exposure process is carried out). As a result, the remaining portions of the black photosensitive resin layer 26R are masked and self-aligned with the existing red, green and blue color filters 16, 18 and 20, and then developed. In this manner, an opaque layer 26, of which the opaque portions 24 are arranged in the gaps between the adjacent color filters and in the picture frame area, is obtained.

The color filter substrate is obtained as described above.

Compared with a spin coating process that has been used quite often, the dry film process achieves a high material yield and can reduce the manufacturing cost significantly. Also, if the color filter layer and opaque layer are made of the dry films, then each of the two layers can have an even more uniform thickness.

However, in the manufacturing process described above, the opaque layer 26 is formed by subjecting a negative photosensitive resin layer to a backside exposure process as shown in FIG. 14E. Thus, the exposure dose needs to be controlled so as to prevent portions of the black photosensitive resin layer 26R on the color filters 16, 18 and 20 from being exposed to the radiation. For that reason, it is difficult to achieve a thickness or an optical density (OD) value which is sufficiently high for the remaining portions of the black photosensitive resin layer 26R to function as the opaque layer just as intended. Consequently, the resultant LCD often has a decreased contrast ratio. It should be noted that the OD value represents the transmittance of a substance. The higher the OD value of a substance, the lower the transmittance thereof.

SUMMARY OF THE INVENTION

In order to overcome the problems described above, preferred embodiments of the present invention provide a color filter substrate, which can minimize the unwanted decrease in display quality of a color display device, and also provide a method for fabricating such a color filter substrate.

A color filter substrate fabricating method according to a preferred embodiment of the present invention is a method for fabricating a color filter substrate including a transparent substrate with a first edge and a second edge that are opposed to each other and a color filter layer and an opaque layer, both of which are provided on the transparent substrate. The color filter layer preferably includes at least one color filter of a first type, at least one color filter of a second type and at least one color filter of a third type, all of which extend in a first direction from the first edge toward the second edge of the transparent substrate. Each color filter of the third type is preferably provided between two associated color filters of the first and second types. The opaque layer preferably includes opaque portions of a first type extending in the first direction and an opaque portion of a second type, which is connected to the opaque portions of the first type and which is provided near and along the second edge. The opaque portions of the first type are preferably provided between the first and third types of color filters and between the third and second types of color filters. The method preferably includes the steps of forming the opaque layer on the transparent substrate, and forming the color filter layer on the transparent substrate after the opaque layer has been formed thereon. The step of forming the opaque layer preferably includes the step of forming a first opening between one end of an area in which each color filter of the third type will be provided and the second edge of the transparent substrate. The step of forming the color filter layer preferably includes the step of attaching a dry film to be the at least one color filter of the third type onto the transparent substrate while rolling the dry film in the first direction after the color filters of the first and second types have been formed on the transparent substrate. When the at least one color filter of the first type includes a plurality of color filters of the first type, the at least one color filter of the second type includes a plurality of color filters of the second type, and the at least one color filter of the third type includes a plurality of color filters of the third type, each of the plurality of color filters of the third type is arranged between associated one of the plurality of color filters of the first type and associated one of the plurality of color filters of the second type.

In one preferred embodiment of the present invention, the step of forming the color filter layer preferably further includes the step of closing the first opening with a first dummy color filter by attaching the dry film to be the at least one color filter of the third type onto the transparent substrate while rolling the dry film up to the first opening.

In another preferred embodiment of the present invention, the step of forming the first opening preferably includes the step of spacing the first opening from the end of the area in which each color filter of the third type will be provided by more than approximately 0 μm but equal to or less than approximately 40 μm.

In an alternative preferred embodiment, the step of forming the first opening may include the step of forming the first opening adjacent to the area in which each color filter of the third type will be provided.

In still another preferred embodiment, the step of forming the opaque layer preferably further includes the step of forming a second opening between one end of an area in which each color filter of the second type will be provided and the second edge of the transparent substrate. The step of forming the color filter layer further includes the step of attaching a dry film to be the at least one color filter of the second type onto the transparent substrate while rolling the dry film in the first direction after the at least one color filter of the first type has been provided on the transparent substrate and before the at least one color filter of the third type is provided on the transparent substrate.

In this particular preferred embodiment, the step of forming the color filter layer preferably further includes the step of closing the second opening with a second dummy color filter by attaching the dry film to be the at least one color filter of the third type onto the transparent substrate while rolling the dry film up to the second opening.

In yet another preferred embodiment, the step of forming the second opening preferably includes the step of spacing the second opening from the end of the area in which each color filter of the second type will be provided by more than about 0 μm but equal to or less than about 40 μm.

In an alternative preferred embodiment, the step of forming the second opening may include the step of forming the second opening adjacent to the area in which each color filter of the second type will be provided.

In yet another preferred embodiment, the step of forming the opaque layer preferably further includes the step of forming a third opening between one end of an area in which each color filter of the first type will be provided and the second edge of the transparent substrate. The step of forming the color filter layer preferably further includes the step of attaching a dry film to be the at least one color filter of the first type onto the transparent substrate while rolling the dry film in the first direction before the color filters of the second and third types are provided on the transparent substrate.

In this particular preferred embodiment, the step of forming the color filter layer preferably further includes the step of closing the third opening with a third dummy color filter by attaching the dry film to be the at least one color filter of the third type onto the transparent substrate while rolling the dry film up to the third opening.

In yet another preferred embodiment, the step of forming the third opening preferably includes the step of spacing the third opening from the end of the area in which each color filter of the first type will be provided by more than about 0 μm but equal to or less than about 40 μm.

In an alternative preferred embodiment, the step of forming the third opening may include the step of forming the third opening adjacent to the area in which each color filter of the first type will be provided.

In yet another preferred embodiment, the step of forming the color filter layer preferably further includes the step of making the color filters of the first and second types of respective dry films.

In yet another preferred embodiment, the step of forming the opaque layer preferably further includes the step of making the opaque layer of a dry film.

In yet another preferred embodiment, the step of forming the opaque layer preferably further includes the step of forming the thickness of the opaque layer to be within the range of about 0.1 μm to about 3.0 μm.

In yet another preferred embodiment, the step of forming the color filter layer preferably further includes the step of making the first and second types of color filters by a spin coating process or by an inkjet printing process.

In yet another preferred embodiment, the step of forming the opaque layer preferably further includes the step of making the opaque layer of a metal material.

In yet another preferred embodiment, the step of forming the color filter layer preferably further includes the step of providing one of a red color filter and a green color filter as each color filter of the first type, the other of the red and green color filters as each color filter of the second type, and a blue color filter as each color filter of the third type, respectively.

In yet another preferred embodiment, the step of forming the color filter layer preferably further includes the step of arranging the first, second and third types of color filters such that each of the color filters partially overlaps with an associated one of the opaque portions of the first type.

In yet another preferred embodiment, the step of forming the color filter layer preferably further includes the step of arranging the first, second and third types of color filters such that each of the color filters has a first group of portions with a first width and a second group of portions with a second width, which is smaller than the first width, and that one end of each of the color filters, which is closer to the second edge of the transparent substrate, is one of the portions of the first group with the first width.

In this particular preferred embodiment, the width of the first opening, as measured in a second direction, which is substantially perpendicular to the first direction, is preferably substantially equal to the first width.

In yet another preferred embodiment, the color filter layer preferably further includes at least one color filter of a fourth type extending in the first direction. Each color filter of the fourth type may be arranged so as to be adjacent to its associated color filter of the first type and interpose the color filter of the first type between itself and its associated color filter of the third type. Alternatively, each color filter of the fourth type may also be arranged so as to be adjacent to its associated color filter of the second type and interpose the color filter of the second type between itself and its associated color filter of the third type. The step of forming the color filter layer preferably further includes the step of attaching a dry film to be the at least one color filter of the fourth type onto the transparent substrate while rolling the dry film in the first direction before the at least one color filter of the first type is provided on the transparent substrate.

In this particular preferred embodiment, the step of forming the opaque layer preferably further includes the step of forming a fourth opening between one end of an area in which each color filter of the fourth type will be provided and the second edge of the transparent substrate. The step of forming the color filter layer preferably further includes the step of closing the fourth opening with a fourth dummy color filter by attaching the dry film to be the at least one color filter of the third type onto the transparent substrate while rolling the dry film up to the fourth opening.

In yet another preferred embodiment, the step of forming the fourth opening preferably includes the step of spacing the fourth opening from the end of the area in which each color filter of the fourth type will be provided by more than about 0 µm but equal to or less than about 40 µm.

In an alternative preferred embodiment, the step of forming the fourth opening may include the step of forming the fourth opening adjacent to the area in which each color filter of the fourth type will be provided.

In yet another preferred embodiment, each color filter of the third type is preferably a blue color filter, and the color filters of the first, second and fourth types are preferably mutually different colors and each is preferably selected from the group consisting of a red color filter, a green color filter and an uncolored transparent color filter.

In this particular preferred embodiment, each color filter of the first type preferably includes a plurality of color filters of the first type arranged in the first direction, each color filter of the second type preferably includes a plurality of color filters of the second type arranged in the first direction, and each color filter of the third type preferably includes a plurality of color filters of the third type arranged in the first direction. A gap between two adjacent ones of the color filters of the first type, a gap between two adjacent ones of the color filters of the second type, and a gap between two adjacent ones of the color filters of the third type are preferably defined over the opaque portions of the third type.

In yet another preferred embodiment, the step of forming the opaque layer preferably further includes the step of forming the opaque portions of the third type, each connecting together its associated two adjacent ones of the opaque portions of the first type. Each of the opaque portions of the third type, preferably has a width which is greater than approximately 0 µm but equal to or smaller than approximately 40 µm as measured in the first direction.

In this particular preferred embodiment, each color filter of the first type preferably includes a plurality of color filters of the first type arranged in the first direction, each color filter of the second type preferably includes a plurality of color filters of the second type arranged in the first direction, each color filter of the third type preferably includes a plurality of color filters of the third type arranged in the first direction, and each color filter of the fourth type preferably includes a plurality of color filters of the fourth type arranged in the first direction. A gap between two adjacent ones of the color filters of the first type, a gap between two adjacent ones of the color filters of the second type, a gap between two adjacent ones of the color filters of the third type and a gap between two adjacent ones of the color filters of the fourth type are preferably defined over the opaque portions of the third type.

A color filter substrate according to a preferred embodiment of the present invention preferably includes a transparent substrate with a first edge and a second edge that are opposed to each other, and a color filter layer and an opaque layer, both of which are provided on the transparent substrate. The color filter layer preferably includes at least one color filter of a first type, at least one color filter of a second type and at least one color filter of a third type, all of which extend in a first direction from the first edge toward the second edge of the transparent substrate. Each color filter of the third type is preferably provided between two associated color filters of the first and second types. The opaque layer preferably includes opaque portions of a first type extending in the first direction and an opaque portion of a second type, which is connected to the opaque portions of the first type and which is provided near and along the second edge. The opaque portions of the first type are preferably provided between the first and third types of color filters and between the third and second types of color filters.

The color filter substrate is preferably fabricated by performing the steps of forming the opaque layer on the transparent substrate, and forming the color filter layer on the transparent substrate after the opaque layer has been formed thereon. The step of forming the opaque layer preferably includes the step of forming a first opening between one end of an area in which each color filter of the third type will be provided and the second edge of the transparent substrate. The step of forming the color filter layer preferably includes the step of attaching a dry film to be the at least one color filter of the third type onto the transparent substrate while rolling the dry film in the first direction after the color filters of the first and second types have been provided on the transparent substrate.

A display device according to a preferred embodiment of the present invention preferably includes the color filter substrate of the preferred embodiment described above, and an active-matrix substrate, which is arranged so as to face the color filter substrate with a display medium layer interposed between the substrates.

A color filter substrate according to another preferred embodiment of the present invention preferably includes a transparent substrate with a first edge and a second edge that are opposed to each other, and a color filter layer and an opaque layer, both of which are provided on the transparent substrate. The color filter layer preferably includes at least one color filter of a first type, at least one color filter of a second type and at least one color filter of a third type, all of which extend in a first direction from the first edge toward the second edge of the transparent substrate. Each color filter of the third type is preferably provided between two associated color filters of the first and second types. The opaque layer preferably includes opaque portions of a first type extending in the first direction and an opaque portion of a second type, which is connected to the opaque portions of the first type and which is provided near and along the second edge. The opaque portions of the first type are preferably provided between the first and third types of color filters and between the third and second types of color filters. The opaque layer preferably further includes a first opening between one end of each color filter of the first type and the second edge, a second opening between one end of each color filter of the second type and the second edge, and a third opening between one end of each color filter of the third type and the second edge, respectively. A first dummy color filter, a second dummy color filter and a third dummy color filter are preferably provided in the first, second and third openings, respectively.

In one preferred embodiment of the present invention, the at least one color filter of the first type is preferably made of one of a red colored layer and a green colored layer, the at least one color filter of the second type is preferably made of the other of the red and green colored layers, and the at least one color filter of the third type and the first, second and third dummy color filters are preferably made of a blue colored layer.

In another preferred embodiment, the color filter layer preferably further includes at least one color filter of a fourth type extending in the first direction. Each color filter of the fourth type may be arranged so as to be adjacent to its associated color filter of the first type and interpose the color filter of the first type between itself and its associated color filter of the third type. Alternatively, each color filter of the fourth type may also be arranged so as to be adjacent to its associated color filter of the second type and interpose the color filter of the second type between itself and its associated color filter of the third type. The opaque layer preferably further includes a fourth opening between one end of each color filter of the fourth type and the second edge. A fourth dummy color filter is preferably provided in the fourth opening.

In this particular preferred embodiment, the at least one color filter of the third type and the first, second and third dummy color filters are preferably made of a blue colored layer, and the color filters of the first, second and fourth types are preferably made of layers in mutually different colors and each of the color filters of the first, second and fourth types is preferably made of a red colored layer, a green colored layer or an uncolored transparent layer.

In yet another preferred embodiment, the opaque layer preferably further includes opaque portions of a third type, each connecting together two adjacent associated opaque portions of the first type. Each of the opaque portions of the third type preferably has a width which is greater than approximately 0 μm but equal to or smaller than approximately 40 μm as measured in the first direction.

In this particular preferred embodiment, each color filter of the first type preferably includes a plurality of color filters of the first type arranged in the first direction, each color filter of the second type preferably includes a plurality of color filters of the second type arranged in the first direction, and each color filter of the third type preferably includes a plurality of color filters of the third type arranged in the first direction. A gap between two adjacent ones of the color filters of the first type, a gap between two adjacent ones of the color filters of the second type, and a gap between two adjacent ones of the color filters of the third type are preferably defined over the opaque portions of the third type.

In an alternative preferred embodiment, each color filter of the first type preferably includes a plurality of color filters of the first type arranged in the first direction, each color filter of the second type preferably includes a plurality of color filters of the second type arranged in the first direction, each color filter of the third type preferably includes a plurality of color filters of the third type arranged in the first direction, and each color filter of the fourth type preferably includes a plurality of color filters of the fourth type arranged in the first direction. A gap between two adjacent ones of the color filters of the first type, a gap between two adjacent ones of the color filters of the second type, a gap between two adjacent ones of the color filters of the third type and a gap between two adjacent ones of the color filters of the fourth type are preferably defined over the opaque portions of the third type.

A display device according to another preferred embodiment of the present invention preferably includes the color filter substrate of the various preferred embodiments described above, and an active-matrix substrate, which is arranged so as to face the color filter substrate with a display medium layer interposed between the substrates. The active-matrix substrate preferably includes a plurality of pixel electrodes thereon. The pixel electrodes are preferably arranged in a matrix extending in the first direction and in a second direction, which is substantially perpendicular to the first direction, so as to face the at least one color filter of the first type, the at least one color filter of the second type and the at least one color filter of the third type. The active-matrix substrate preferably further includes a first dummy pixel electrode, a second dummy pixel electrode and a third dummy pixel electrode, which are arranged so as to face the first, second and third openings, respectively, and all of which are preferably made of a metal layer.

A display device according to still another preferred embodiment of the present invention preferably includes the color filter substrate of the various preferred embodiments described above and an active-matrix substrate, which is arranged so as to face the color filter substrate with a display medium layer interposed between the substrates. The active-matrix substrate preferably includes a plurality of pixel electrodes thereon. The pixel electrodes are preferably arranged in a matrix extending in the first direction and in a second direction, which is substantially perpendicular to the first direction, so as to face the at least one color filter of the first type, the at least one color filter of the second type and the at least one color filter of the third type. The active-matrix substrate preferably further includes a first dummy pixel electrode, a second dummy pixel electrode and a third dummy pixel electrode, which are arranged so as to face the first, second and third openings, respectively. The display medium layer on the first, second and third dummy pixel electrodes is preferably controlled so as to exhibit a black display state.

In a method for fabricating a color filter substrate according to any of the various preferred embodiments of the present invention, the opaque layer is preferably formed before the color filter layer is formed. Thus, the thickness and/or the OD value of the opaque layer need not be controlled as in the conventional process. Also, an opening is preferably provided in a predetermined area of the opaque layer. Accordingly, in the process step of making color filters of a dry film, the bubbles produced can be dissipated away through the opening. As a result, a color filter substrate, which can minimize the unwanted decrease in display quality of a color display device, can be obtained.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1 is a partial plan view of a color filter substrate 50 according to a first specific preferred embodiment of the present invention.

FIG. 7 is a partial plan view of a color filter substrate 50C according to another modified example of the first preferred embodiment of the present invention.

FIG. 8 is a partial plan view of a color filter substrate 80 according to a second specific preferred embodiment of the present invention.

FIGS. 14A through 14F are cross-sectional views showing a conventional method for fabricating a color filter substrate.

DETAILED DESCRIPTION OF PREFERRED EMBODIMENTS

In the conventional process described above, a color filter layer is formed first, and then an opaque layer (light shielding layer) is formed by a backside exposure process as shown in FIG. 14E. In contrast, in a method for fabricating a color filter substrate according to any of various preferred embodiments of the present invention, the opaque layer is preferably formed before the color filter layer is formed. Thus, the thickness and/or the OD value of the opaque layer need not be controlled as in the conventional process. That is to say, in the color filter substrate manufacturing process according to any of preferred embodiments of the present invention, an opaque layer with a sufficient thickness and/or an excellent OD value can be formed. However, if the color filter substrate is fabricated just by forming the opaque layer before the color filter layer and if multiple groups of color filters are sequentially made by a dry film process on a color-by-color basis, then bubbles often remain between the last group of color filters and the substrate, thus causing some defects in the resultant image. The reason is as follows. Specifically, when the last group of color filters starts to be formed, the areas for the last group of color filters are already surrounded with the opaque portions and the other groups of color filters. Accordingly, while the dry film to be the last group of color filters is rolled and attached, the bubbles produced between the dry film and the substrate cannot be dissipated away. In the method for fabricating a color filter substrate according to a preferred embodiment of the present invention, however, an opening is formed at a predetermined position of the opaque layer, and therefore, those bubbles can be dissipated away.

Hereinafter, a color filter substrate and its manufacturing process according to various preferred embodiments of the present invention will be described with reference to the accompanying drawings. As in the background section above, the color filter substrate of each of the following preferred embodiments of the present invention is preferably for use in an active-matrix-addressed LCD. However, the present invention is in no way limited to such specific preferred embodiments.

First Preferred Embodiment

FIG. 1 is a partial plan view showing a color filter substrate 50 according to a first specific preferred embodiment of the present invention. The cross-sectional structure of the color filter substrate 50 is basically the same as that of the color filter substrate 4 shown in FIG. 13. Hereinafter, the color filter substrate 50 will be described with reference to FIGS. 1 and 13.

Figure 13:
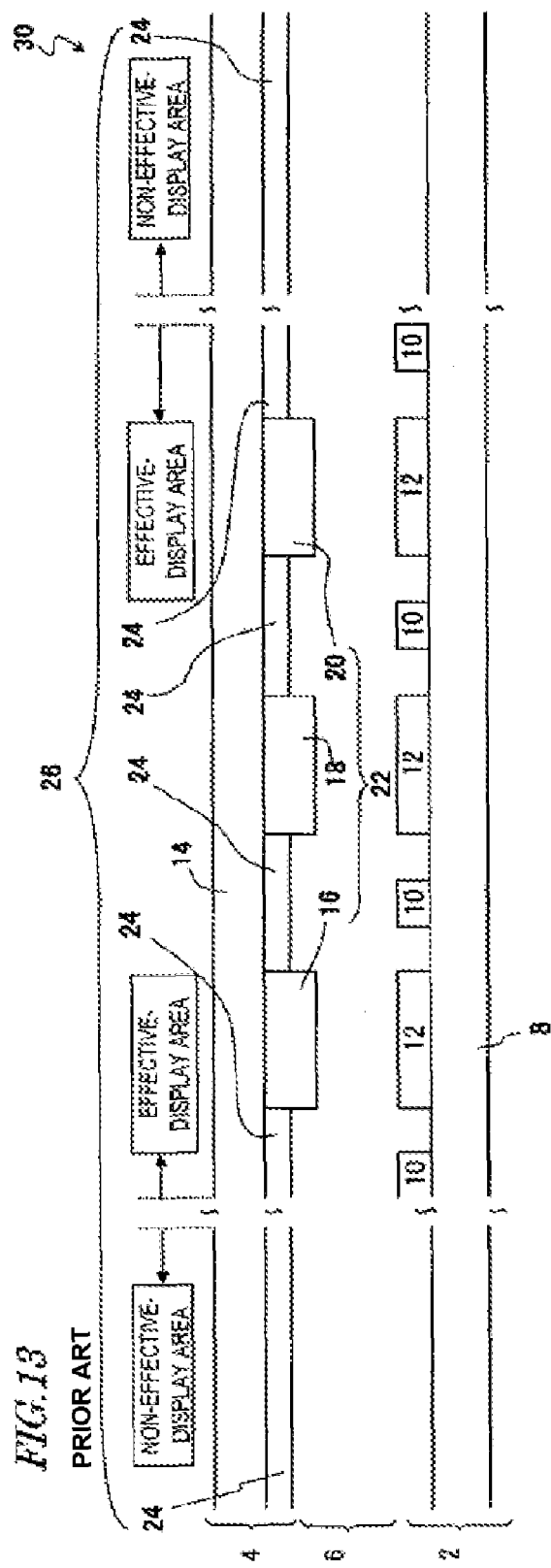
FIG. 13 is a cross-sectional view of a normal active-matrix-addressed LCD.

As shown in FIGS. 1 and 13, the color filter substrate 50 of the first preferred embodiment preferably includes a transparent substrate 14 and a color filter layer 62 and an opaque layer 68, which are provided on the transparent substrate 14. The color filter layer 62 preferably includes a first type of color filters 56, a second type of color filters 58 and a third type of color filters 60, which are preferably arranged so as to define a striped pattern. In a typical application, each of the color filters of the first, second and third types is preferably a red, green or blue color filter. Each of the color filters of the first, second and third types preferably has the shape of a strip extending from a first edge (not shown) of the transparent substrate 14 toward a second edge 52 thereof in the direction indicated by the arrow 70 in FIG. 1 (which direction will be referred to herein as a "first direction"). The first and second edges of the transparent substrate 14 are opposed to each other. These color filters are preferably arranged so as to face respective columns of pixels. Also, as shown in FIG. 1, each color filter 60 of the third type is preferably provided between two associated color filters 56 and 58 of the first and second types.

It should be noted that each set of three color filters arranged in this manner does not always have to be included in a single color pixel. As used herein, the "single color pixel" refers to a minimum unit for color display consisting of red (R), green (G) and blue (B) pixels. That is to say, the third type of color filter does not have to be located at the center of each and every color pixel.

The first, second and third types of color filters 56, 58 and 60 are typically arranged such that their edges 56β, 58β and 60β that are closer to the second edge 52 of the transparent substrate 14 are aligned with the boundary between the (effective) display area and the picture frame area (i.e., non-effective-display area). In the preferred embodiment illustrated in FIG. 1, a dummy color filter 60α is preferably provided between the edge of the third type of color filter 60 and the second edge 52 so as to define a gap between them. Alternatively, the third type of color filter 60 and the dummy color filter 60α may be combined together with no gaps existing between them. The dummy color filter 60α is provided in the picture frame area and does not contribute to a display operation substantively. As used herein, each "color filter" is preferably provided so as to define the color in which its associated pixel is displayed. Thus, each color filter refers to a colored layer provided within the effective display area, not a colored layer provided within the non-effective-display area, unless stated otherwise.

The opaque layer 68 preferably includes opaque portions of a first type 64 and an opaque portion of a second type 66. The opaque portions of the first type 64 preferably extend in the first direction 70 between the first and third types of color filters 56 and 60 and between the third and second types of color filters 60 and 58. The opaque portion of the second type 66 is preferably provided near and along the second edge 52 of the transparent substrate 14, and is preferably connected to the opaque portions of the first type 64. An opening 72 is preferably defined between the edge 60β of the third type of color filter 60 and the second edge 52 and is preferably spaced from the edge 60β by a predetermined distance H. When a display device is fabricated using this color filter substrate 50, the opaque portions of the first type 64 are preferably provided within the effective display area and the opaque portion of the second type 66 is preferably provided within the non-effective-display area. It should be noted that the opening 72 and the dummy color filter 60α, which is actually located over the opening 72, are collectively identified by a pair of reference numerals 60α (72) in FIG. 1, for example.

As will be described in detail later concerning a preferred manufacturing process of the color filter substrate 50 of this preferred embodiment, the opaque layer is preferably formed before the color filter layer is formed. For that reason, in forming the opaque layer, the exposure dose does not have to be controlled so strictly as in the conventional process. Thus, an opaque layer with a sufficient thickness and/or a good OD value can be obtained. In the conventional color filter substrate shown in FIG. 14, the opaque layer thereof has an OD value of less than 2.0 and a thickness of 1.0 μm or less. In contrast, the color filter substrate 50 of this preferred embodiment may include an opaque layer with an OD value of about 2.0 or more and a thickness of about 0.1 μm to about 3.0 μm. In addition, in the color filter substrate 50 of this preferred embodiment, the opaque layer has the opening 72. Accordingly, in the process step of forming the color filter layer, the bubbles produced between the color filter layer 62 and the substrate 14 can be dissipated away through that opening 72.

Hereinafter, an exemplary method for fabricating the color filter substrate 50 of this preferred embodiment will be described with reference to FIGS. 1 and 2A through 2E. FIGS. 2A through 2E are cross-sectional views as viewed on the plane 2A-2A' shown in FIG. 1. In the manufacturing process to be described below, the opaque portions making up the opaque layer 68 and the color filters making up the color filter layer 62 are preferably made of respective dry films. Each of those dry films is preferably a photosensitive resin layer (colored layer), which is normally sandwiched between two film supporting members 60S of polyethylene terephthalate (PET) films, for example. The photosensitive resin layer is preferably one of four types of dry films, in which a red, green, blue or black pigment is dispersed, and is typically negative.

First, before the color filter layer 62 is formed, the opaque layer 68 is preferably formed. In the conventional process described above, a color filter layer is formed first, and then an opaque layer is formed by a backside exposure process as shown in FIG. 14E. In contrast, in this preferred embodiment, the opaque layer 68 is preferably formed before the color filter layer 62 is formed. Thus, in the process step of forming the opaque layer, the exposure dose need not be controlled so strictly as in the conventional process. Thus, an opaque layer with a sufficient thickness and/or a good OD value can be formed. The opaque layer 68 may be formed in the following manner, for example.

Figure 2A:
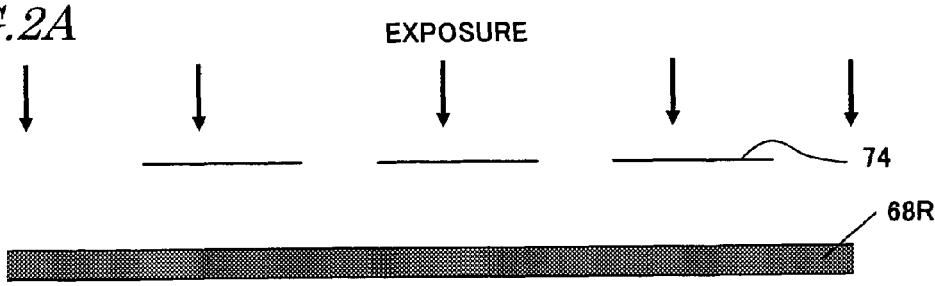
FIGS. 2A through 2E are cross-sectional views showing an exemplary method for fabricating the color filter substrate 50.

Specifically, a black dry film for the opaque layer 68 is preferably attached onto, and rolled on by a roller 34 (see FIG. 3) against, the transparent substrate 14 and then the film supporting member is preferably peeled off, thereby transferring a black photosensitive resin layer 68R onto the substrate 14 as shown in FIG. 2A. This process step is normally carried out with the dry film heated and is a so-called "thermal transfer process".

Figure 2B:
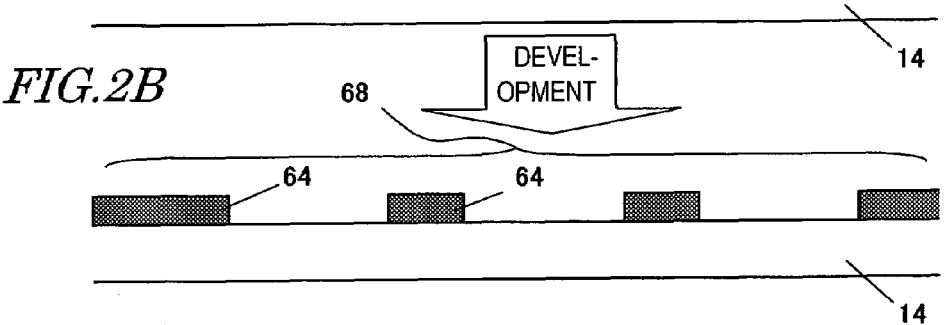

Subsequently, as shown in FIG. 2A, the black photosensitive resin layer 68R is preferably exposed to a radiation through a mask 74 and then developed, thereby forming an opaque layer 68. In this process step, the first type of opaque portions 64 are preferably made such that openings for the color filters of the first, second and third types are defined in respective areas for the first, second and third types of color filters 56, 58 and 60 as shown in FIG. 2B and the opaque portion of the second type 66 is preferably made such that the opening 72 is defined between the edge of the opening for the third type of color filter and the second edge 52.

As shown in FIG. 1, the opening 72 of the opaque layer 68 is preferably arranged so as to be spaced apart from the edge 60β of the opening for the third type of color filter 60 (i.e., the area in which the third type of color filter 60 will be provided) by the predetermined distance H. That is to say, the opening 72 is preferably arranged such that a boundary portion 66A is interposed between the edge 60β of the area in which the third type of color filter 60 will be provided and the second edge 52. The predetermined distance H is preferably greater than about 0 μm but equal to or smaller than about 40 μm, more preferably about 20 μm or less. If the distance H falls within this range, then the bubbles produced between the dry film for the third type of color filter 60 and the substrate 14 (on which the opaque layer 68 and first and second types of color filters 56 and 58 have already been provided) can be dissipated away sufficiently through the opening 72 by way of the boundary portion 66A of the opaque portion of the second type 66. It should be noted that the opening 72 may be adjacent to the area in which the third type of color filter 60 will be provided (within the effective display area). However, the boundary portion 66A is preferably provided between them as shown in FIG. 1. The reason is as follows. Specifically, another opaque layer is normally provided in the non-effective-display area of an active-matrix substrate (e.g., a TFT substrate), which is arranged so as to face the color filter substrate. Sometimes (e.g., if the opaque layer of the TFT substrate and gate bus lines are made of the same metal film), a gap may be provided between the opaque layer and the effective display area. In that case, if no boundary portion 66A is provided for the opaque layer 68 of the color filter substrate, then light leaking through the gap of the TFT substrate may be perceivable. Thus, to avoid such leakage of light, the boundary portion 66A is preferably provided.

In this preferred embodiment, each of the opaque portions 64 of the first type is preferably formed to have convex portions 64A at predetermined locations for the purpose of shielding the TFTs on active-matrix substrate from incoming light.

It should be noted that the opaque layer 68 does not have to be made of the dry film but may be made of chromium or any other suitable metal material. If the opaque layer is made of a metal material, the opaque layer is preferably formed by photolithographic and etching processes.

Figure 2C:
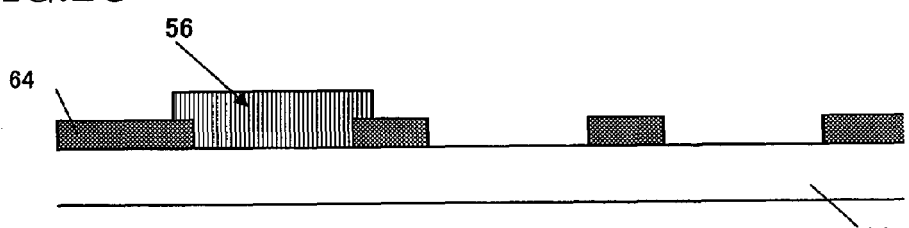
Figure 2D:
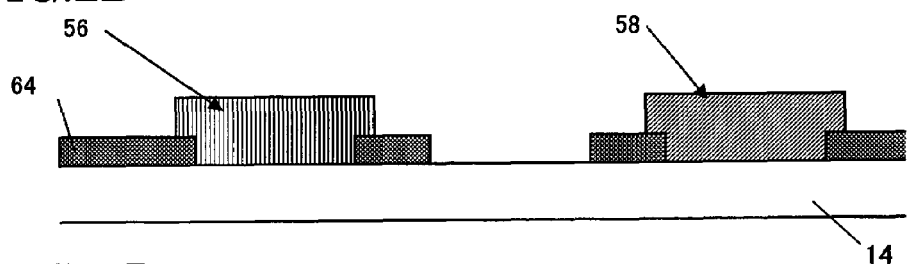
Figure 2E:
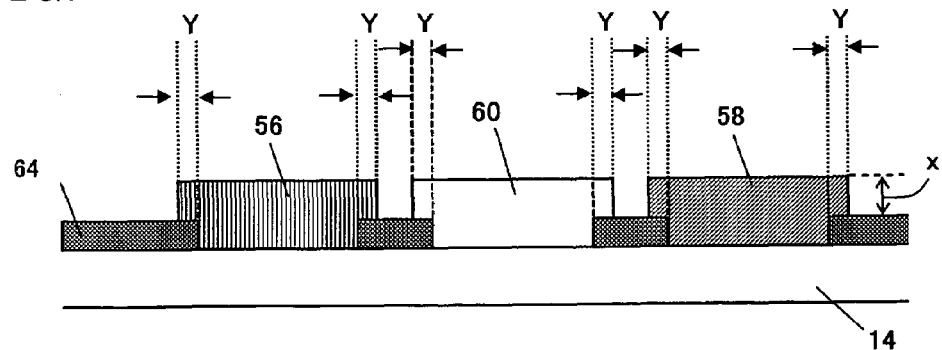

After the opaque layer 68 has been formed in this manner, a color filter layer 62 is preferably formed as shown in FIGS. 2C, 2D and 2E. The color filter layer 62 may be formed in the following manner, for example.

As in the process step of forming the opaque layer 68, a dry film for the first type of color filters 56 is preferably attached onto, and rolled on by the roller 34 in the first direction 70 against, the substrate 14, and then the film supporting member is preferably peeled off, thereby transferring a photosensitive resin layer for the first type of color, filters 56 (which will be referred to herein as a "first colored layer") onto the substrate. Subsequently, the first colored layer is preferably exposed to a radiation through a mask and then developed, thereby removing excessive portions of the first colored layer and leaving the other portions of the first colored layer within the openings for the color filters 56 of the first type. In this manner, the color filters 56 of the first type can be obtained. Next, the color filters 58 of the second type are also made by the same technique as that used for making the color filters 56 of the first type.

Figure 3:
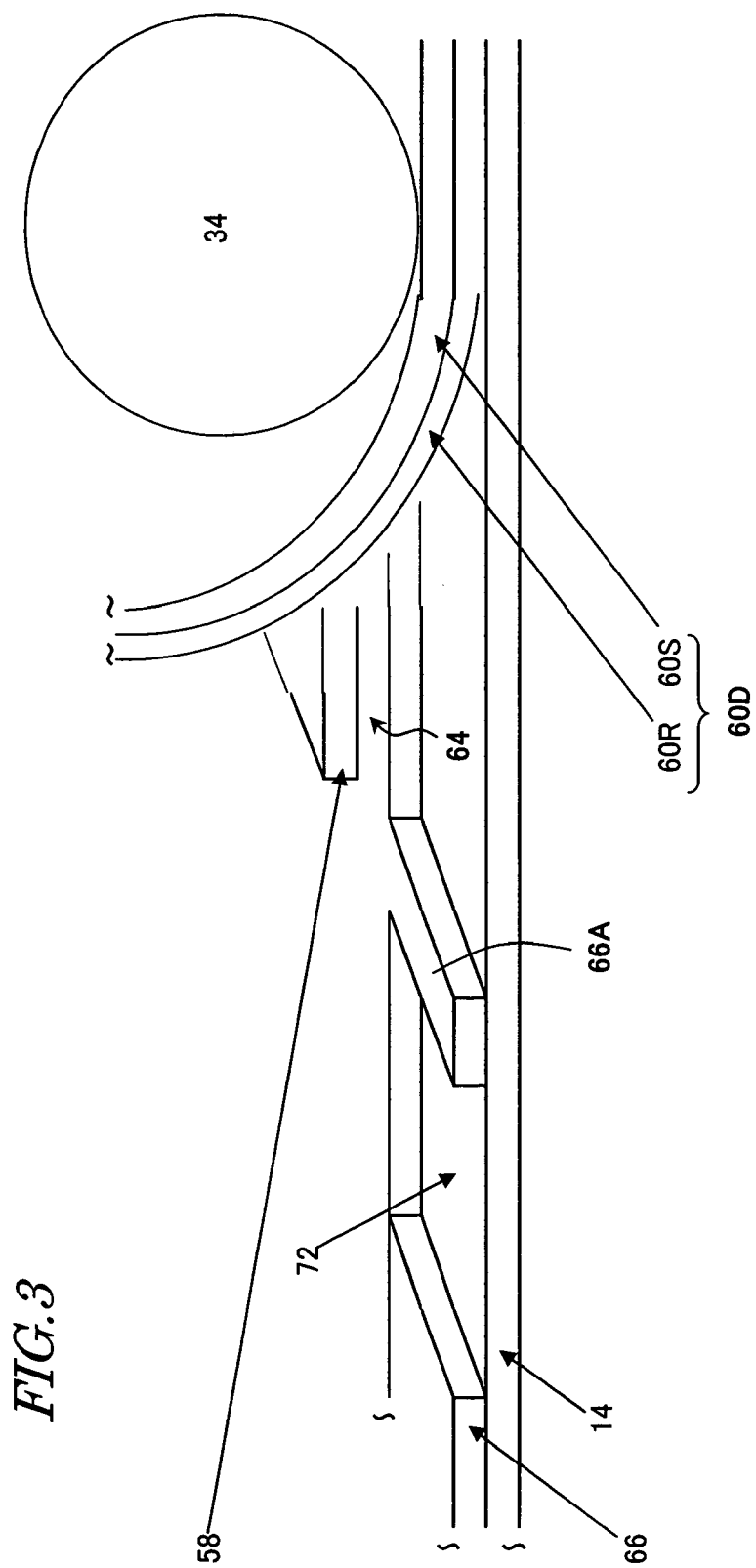
FIG. 3 is a perspective view showing the process step of making a third type of color filters 60.
Figure 4:
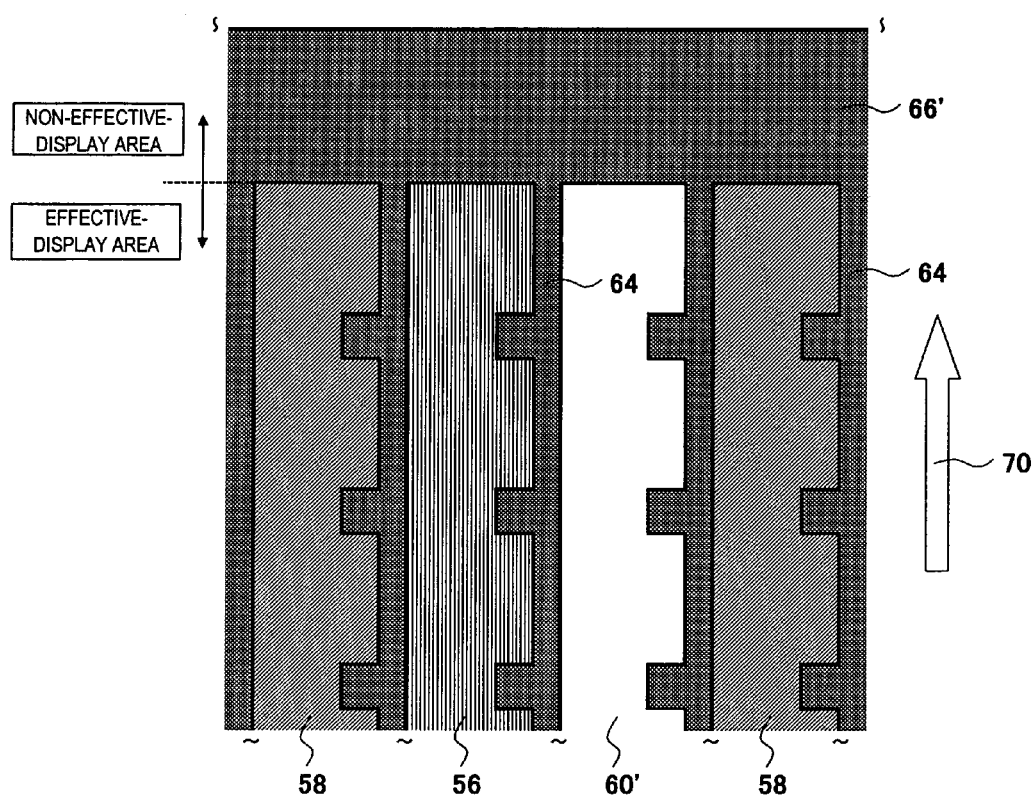
FIG. 4 is a partial plan view of a color filter substrate according to a comparative example.
Figure 5:
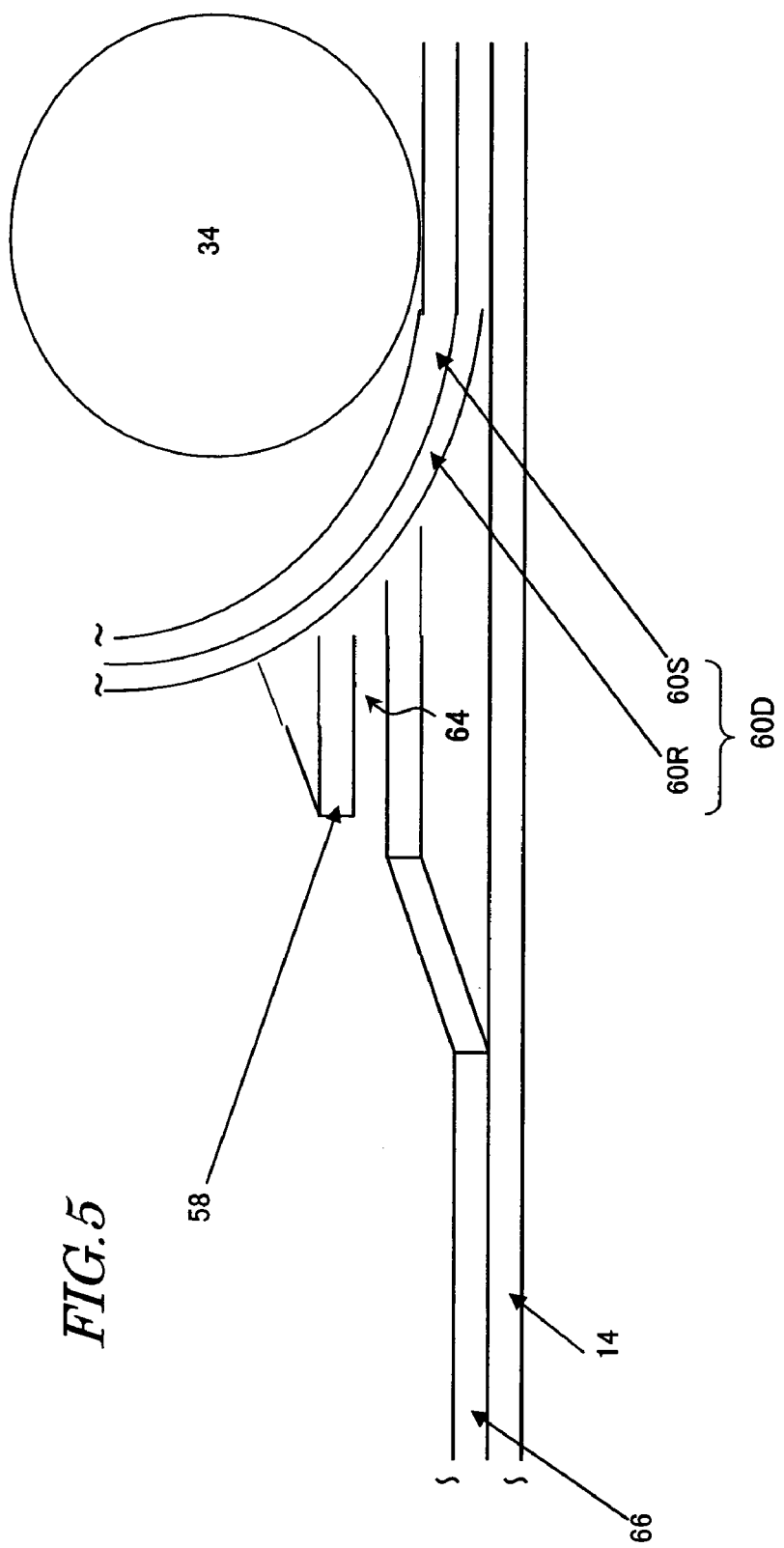
FIG. 5 is a perspective view showing the process step of making a third type of color filters 60' in the comparative example.

Hereinafter, the process step of making the color filters 60 of the third type will be described in detail with reference to FIG. 3. The cross section shown in FIG. 3 is taken along the line III-III shown in FIG. 1 and viewed in the direction indicated by the arrow 71 shown in FIG. 1. A comparative example is shown in FIGS. 4 and 5, which correspond to FIGS. 1 and 3, respectively.

A dry film 60D for the third type of color filters 60 is preferably attached onto, and rolled on by the roller 34 against, the transparent substrate 14, and then the film supporting member 60S is preferably peeled off, thereby transferring a photosensitive resin layer for the third type of color filters 60 (which will be referred to herein as a "third colored layer") onto the substrate 14. Thereafter, the third colored layer is preferably exposed to a radiation through a mask and then developed, thereby removing excessive portions of the third colored layer from over the opaque portions of the first type 64, first type of color filters 56 and second type of color filters 58 in the effective display area and from over the opaque portion of the second type 66 in the non-effective-display area. In this manner, the third type of color filters 60 are obtained and a dummy color filter 60α is also made by closing the opening 72 with the third colored layer.

Alternatively, the pattern of the third type of color filters 60 may also be defined by performing a backside exposure process with the opaque layer and first and second types of color filters being used as a mask.

In attaching the dry film 60D to be the third type of color filters 60 onto the substrate 14, the surface of the substrate 14 is entirely covered with the first and second types of color filters 56 and 58 and the first and second types of opaque portions 64 and 66 except for the areas where the third type of color filters 60 will be provided and the openings 72. Accordingly, if no openings are provided for portions of the opaque layer in the non-effective-display area as shown in FIG. 4, then the bubbles produced between the substrate 14 and the dry film 60' cannot be dissipated away while a dry film to be the third type of color filters is being attached and rolled on against the substrate. If those bubbles remain, then no photosensitive resin will be present there and uncolored defects will result.

In this preferred embodiment, the opaque portion of the second type 66 in the non-effective-display area preferably has the openings 72 such that each of those openings 72 is located between the edge 60β of the area in which its associated color filter of the third type 60 will be provided and the second edge 52 of the transparent substrate 14 with the boundary portion 66A interposed between them. Accordingly, as shown in FIG. 3, while the dry film 60D to be the third type of color filters 60 is being attached, the bubbles produced can be dissipated away through the opening 72 by way of the boundary portion 66A of the opaque portion of the second type 66. Since no colored layer is present on either side of the opening 72, the bubbles can be dissipated away easily.

The third colored layer is preferably arranged so as to close each of the openings 72 fully as shown in FIG. 1. It is possible to arrange the third colored layer so as to overlap with the opening 72 only partially or even not to overlap with the opening 72 at all. However, the opening 72 is preferably covered with the third colored layer because leaking light is much less perceivable in that case. It should be noted that even if the bubbles could not leave, but remain in, the opening 72, no defects should be caused easily because the opening 72 is provided in the non-effective-display area.

In the preferred embodiment illustrated in FIG. 1, the third colored layer preferably is not present on the boundary portion 66A of the opaque portion of the second type 66. Alternatively, the third colored layer may also be provided on the boundary portion 66A such that each color filter 60 of the third type is combined with its associated dummy color filter 60α.

The color filters of the third type are preferably not so much red or green color filters as blue color filters. As will be described later, blue color filters have higher light blocking property than red or green color filters. Thus, if the opening 72 is closed with a blue color filter, then the unwanted leakage of light can be minimized with more certainty.

The following Table 1 shows the luminosity (lightness Y) and chromaticity values and thicknesses of the red, green and blue color filters and opaque layer (e.g., black matrix (BM)) for use in this preferred embodiment. It should be noted that the respective parameters shown in Table 1 are nothing but examples and the present invention is in no way limited to these specific examples.

TABLE 1

|  | Thickness | Chromaticity (x, y) | Lightness Y |
|---|---|---|---|
| Red | 2.0 μm | (0.647, 0.342) | 20.4 |
| Green | 2.0 μm | (0.285, 0.605) | 51.3 |
| Blue | 2.0 μm | (0.147, 0.068) | 7.83 |
| BM | 1.0 μm | (—, —) | 3E−4 |

As can be seen from Table 1, the luminosity of the blue color filter is smallest among the red, green and blue color filters. Accordingly, the light that might leak through the opening 72 can be blocked by the blue color filter better than the red or green color filter. The color filters of the first type may be either red color filters or green color filters. And the color filters of the second type may also be either red color filters or green color filters. In a typical application, however, the color filters of the first type are preferably red color filters and the color filters of the second type are preferably green color filters.

The color filters 60 of the third type and the dummy color filters 60α are obtained in this manner, thereby forming the color filter layer as shown in FIG. 2E. Thereafter, this assembly is subjected to predetermined process steps to complete the color filter substrate 50.

As shown in FIGS. 2C through 2E, the first, second and third types of color filters 56, 58 and 60 are preferably arranged so as to partially overlap with the opaque portions of the first type 64. That is to say, each of the color filters 56, 58 and 60 of the first, second and third types is preferably arranged such that its ends (i.e., its opposed longer sides) overlap with the ends of two adjacent opaque portions 64 of the first type. In FIG. 2E, these overlapping portions are identified by the reference sign Y. By providing these overlapping portions Y, color unevenness that might be caused by misalignment of the respective color filters can be eliminated. Also, since the stepped portions between the color filters can be shielded from light by the opaque portions of the first type 64, display defects, caused by disturbed orientations of liquid crystal molecules, are much less perceivable.

Also, in this preferred embodiment, each of the opaque portions 64 of the first type preferably has the convex portion 64A to shield the TFTs on the active-matrix substrate from incoming light, and each of the color filters 56, 58 and 60 of the first, second and third types preferably has a concave portion. That is to say, each of the color filters of the first, second and third types preferably includes portions with a first width and portions with a second width that is smaller than the first width. The first and second widths are preferably measured in a second direction, which is substantially perpendicular to the first direction 70. In this case, the edge 60β of each color filter of the third type preferably has the first width. This is because the bubbles produced can be dissipated away more easily with broader edge width (i.e., the first width) defined at the end of each color filter of the third type in the first direction 70. Also, the width of each opening 72 (i.e., its width as measured in the second direction that is defined perpendicularly to the first direction 70) is preferably equal to the first width.

In the preferred embodiment described above, the color filter layer is formed by the dry film process. However, in a method for fabricating a color filter substrate according to a preferred embodiment of the present invention, as long as the opaque layer and color filters of the third type, which should be provided last of the three types of color filters, are made by the dry film process, the other color filters of the first and second types may be made by any other method. However, compared with a spin coating process that uses a liquid photosensitive material, the dry film process achieves a higher material yield, a lower manufacturing cost, and a layer with a more uniform thickness. Also, a layer formed by the dry film process has a more uniform thickness than a layer formed by an inkjet printing process, for example. Furthermore, if the color filters included in the color filter layer and the opaque portions included in the opaque layer all can be obtained by the same method, then the manufacturing process can be simplified advantageously. In view of these considerations, all of the color filters making up the color filter layer and all of the opaque portions making up the opaque layer are preferably made by the dry film process.

Optionally, however, the first and second types of color filters and opaque portions may be made by a spin coating process. In that case, a photosensitive resin in which a pigment in a desired color is dispersed is preferably applied onto the surface of a glass substrate with a spinner, dried, exposed to a radiation and then developed, thereby making the color filters and opaque portions. As another alternative, the inkjet printing process may also be adopted. In that case, ink in a desired color is preferably ejected toward, and solidified at, predetermined positions on a glass substrate, thereby making the color filters and opaque portions.

It should be noted, however, that the structure of a color filter substrate according to another preferred embodiment of the present invention may be different from that of the color filter substrate of the first preferred embodiment described above.

Figure 6A:
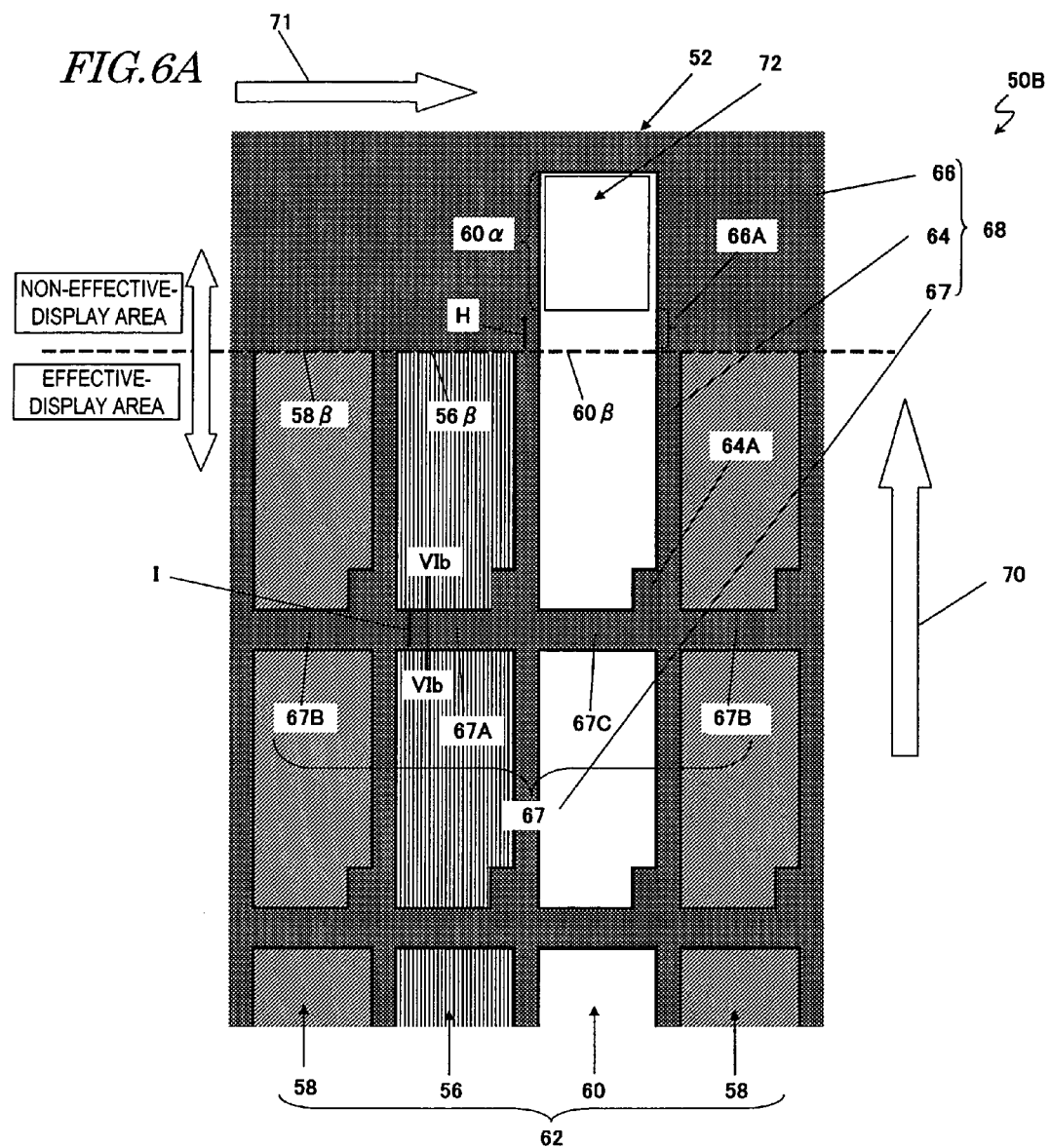
FIG. 6A is a partial plan view of a color filter substrate 50B according to a modified example of the first preferred embodiment of the present invention.

For example, as in the color filter substrate 50B shown in FIG. 6A, the opaque layer 68 may further include opaque portions of a third type 67, each of which connects together two adjacent ones of the opaque portions of the first type 64. The opaque portions of the third type 67 are preferably arranged so as to extend as stripes in the second direction 71 within the effective display area and so as to face the gate bus lines 11 on the active-matrix substrate (see FIG. 12). These additional opaque portions of the third type 67 can significantly reduce the amount of light leaking between the gate bus lines 11 and the transparent pixel electrodes 12, thus minimizing the unwanted deterioration in the display quality of the display device.

The width of the opaque portions of the third type 67 as measured in the first direction 70 is preferably greater than about 0 μm and equal to or smaller than about 40 μm and more preferably about 20 μm or less. The preferred width of the opaque portions of the third type 67 is substantially equal to the preferred width H of the boundary portion 66A between the effective and non-effective-display areas.

If the width of the opaque portions of the third type 67 as measured in the first direction 70 falls within this range, then the bubbles produced between the dry film to be the third type of color filter 60 and the substrate 14 (on which the opaque layer 68 and first and second types of color filters 56 and 58 have already been provided) can be moved in the first direction 70 by way of the opaque portions of the third type 67 and the dry film while the dry film to be the third type of color filters 60 is being attached onto and rolled on against the substrate in the first direction 70. As described above, the width of the boundary portion 66A of the opaque layer 68, which is adjacent to the end 60β of the effective display area, is preferably defined such that the bubbles produced can go over not only the opaque portions of the third type 67 but also the boundary portion 66A. Thus, those bubbles pass the boundary portion 66A and then are dissipated through the openings 72 in the end.

It should be noted that in the process step of making the first or second type of color filters 56 and 58 of a dry film, no color filters are provided yet on at least one side of the area in which the color filters 56 or 58 of the first or second type will be provided. Thus, the bubbles produced can be dissipated very easily and hardly remain on the glass substrate.

In the color filter substrate 50B, the color filter layer 62 preferably includes a first type of color filters 56, a second type of color filters 58 and a third type of color filters 60, all of which are arranged in the first direction 70. In the color filter substrate 60 shown in FIG. 1, each of the color filters 56, 58 and 60 preferably has the shape of a stripe extending in the first direction. In the color filter substrate 50B on the other hand, color filters are preferably provided for respective pixels and the gap between each pair of color filters of the same color, which are adjacent to each other in the first direction 70, is located over associated one of the opaque portions of the third type 67. That is to say, the gap between each pair of adjacent color filters 56 of the first type, which are arranged in the first direction, is preferably located over an associated one of the opaque portions 67A of the third type. The gap between each pair of adjacent color filters 58 of the second type, which are arranged in the first direction, is preferably located over an associated one of the opaque portions of the third type 67B. And the gap between each pair of adjacent color filters 60 of the third type, which are arranged in the first direction, is preferably located over an associated one of the opaque portions of the third type 67C.

Figure 6B:
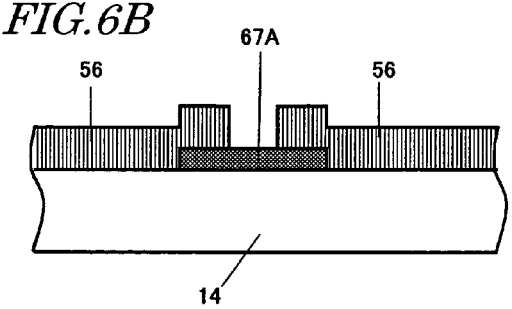
FIG. 6B is a cross-sectional view of the color filter substrate 50B as viewed along the plane VIb-VIb shown in FIG. 6A.

FIG. 6B is a cross-sectional view of the color filter substrate 50B shown in FIG. 6A as viewed on the plane VI-VI shown in FIG. 6A. As shown in FIG. 6B, the opaque portion of the third type 67A is preferably arranged between two adjacent color filters 56 of the first type. The color filters 56 are preferably arranged so as to leave no gaps between the end of any color filter 56 and its associated opaque portion 67A of the opaque portions of the third type 67. Normally, to secure an alignment margin, the color filters 56 are preferably arranged such that the end of each of the color filters 56 is located over its associated opaque portion of the third type 67.

The process step of forming the color filter layer 62 for the color filter substrate 50B preferably includes the steps of attaching a dry film to be the color filters 56, 58 or 60 of the first, second or third type, removing portions of the dry film from over the opaque portions of the third type 67, exposing the dry film to a radiation and developing the dry film.

Figure 6C:
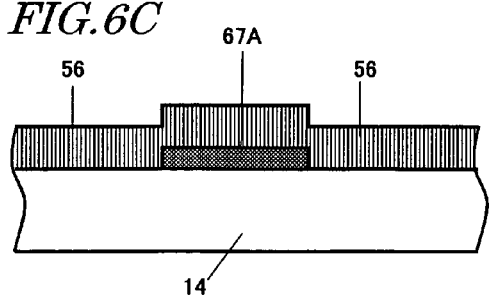
FIG. 6C is a cross-sectional view of an alternative color filter substrate when viewed along the plane VIb-VIb shown in FIG. 6A.

Just like the color filter substrate 60 shown in FIG. 1, the color filter substrate 50B may also include color filters that extend as stripes in the first direction. In that case, the cross section as viewed on the plane VI-VI shown in FIG. 6A will be as shown in FIG. 6C. However, each striped color filter is preferably divided at the opaque portions of the third type 67 as shown in FIG. 6B. This is because the unevenness on the surface of the color filter substrate can be flattened.

In the color filter substrate 50B shown in FIG. 6A, the boundary portion 66A of the opaque portion of the second type 66 is preferably covered with the third colored layer such that the third type of color filter 60 and the dummy color filter 60α are combined together. Also, the color filters are preferably partially removed from over the opaque portions of the third type 67 as shown in FIG. 6B. However, the color filter substrate does not have to have this structure. Alternatively, the boundary portion 66A may be covered with the third colored layer and the opaque portions of the third type 67 may be fully covered with their associated color filters as shown in FIG. 6C.

A color filter substrate according to an alternative preferred embodiment of the present invention may include a color filter layer including four or more types of color filters.

For example, in the color filter substrate 50C shown in FIG. 7, the color filter layer 62 preferably includes not only first, second and third types of color filters 56, 58 and 60 but also a fourth type of color filters 61 as well. As shown in FIG. 7, the fourth type of color filter 61 is preferably adjacent to a first type of color filter 56 and the first type of color filter 56 is sandwiched between the fourth type of color filter 61 and a third type of color filter 60. It should be noted that it is not always necessary to associate each set of four color filters arranged in this pattern with a single color pixel.

Each of the color filters of the first, second, third and fourth types may be one of a red color filter, a green color filter, a blue color filter and an uncolored transparent color filter. Then, the resultant reflective LCD with such a color filter layer can exhibit increased brightness and color reproducibility. Such a reflective LCD with color filters in four colors is disclosed in detail in Japanese Laid-Open Publication No. 2001-296523, for example.

Among the red, green, blue and uncolored transparent color filters, the blue color filter has the smallest luminosity. As described above, the opening 72 is preferably closed with a colored layer exhibiting as low luminosity as possible. Accordingly, in the process step of forming the color filter layer 62 of the red, green, blue and uncolored transparent color filters, the blue color filters are preferably provided last and the openings 72 are preferably covered with a dry film to be the blue color filters.

Thus, in the process step of forming the color filter layer 62, the third type of color filters 60 are preferably formed last. In the color filter substrate 50C on which each opening 72 is defined between the edge 60β of its associated color filter 60 of the third type and the edge 52 of the transparent substrate 14, the third type of color filter 60 is preferably a blue color filter. On the other hand, each of the other color filters of the first, second and fourth types may be a red color filter, a green color filter or an uncolored transparent color filter.

In the color filter layer 62 of the color filter substrate 50C, each of the first, second and third types of color filters 56, 58 and 60 may be made by the same method as that used for forming the color filter layer 62 of the color filter substrate 50 described above. The fourth type of color filters 61 are preferably provided before the first type of color filters 56 are made. The reason is as follows. Specifically, in that case, only in the process step of providing the color filters of the third type as the last group of color filters among the four types, each color filter being made is sandwiched between two existent color filters. However, in the process step of making the first, second or fourth type of color filters 56, 58 or 61 of a dry film, no color filters are provided yet (i.e., the opaque layer 68 still has openings for those color filters) on at least one side of the area in which the color filters 56, 58 or 61 of the first, second or fourth type will be provided.

If the color filter layer 62 is made up of color filters in an n number of colors (where n is a natural number that is equal to or greater than five), then the color filters to be provided as the last group of color filters are preferably the third type of color filters 60, the color filters to be provided as the second last group of color filters are preferably the second type of color filters 58, the color filters to be provided as the third last group of color filters are preferably the first type of color filters 56, and the fourth through n$^{th}$ color filters are preferably provided before the first type of color filters 56 are made as in the color filter substrate 50C described above.

For example, the color filter layer 62 may be made up of color filters in the six colors of red, green, blue, cyan, magenta and yellow. Then, the colors displayed can be more natural than conventional ones. A display device with color filters in these six colors is disclosed in detail in Japanese Laid-Open Publication No. 2002-286927, for example.

Second Preferred Embodiment

In the first preferred embodiment described above, the portion of the opaque layer in the non-effective-display area (i.e., the opaque portion of the second type) selectively has the opening 72 between the edge of the area in which each color filter 60 of the third type will be provided and the second edge 52 of the transparent substrate. However, the present invention is in no way limited to this specific preferred embodiment. Alternatively, the portion of the opaque layer in the non-effective-display area may have not just the openings 72 but also additional openings between the edge of the area in which each color filter 56 of the first type will be provided and the second edge 52 and/or between the edge of the area in which each color filter 58 of the second type will be provided and the second edge 52.

Particularly when the first, second and third types of color filters 56, 58 and 60 are all made of dry films, those openings are preferably provided through the portions of the opaque layer between the areas in which the first and second types of color filters 56 and 58 will be provided and the second edge 52. Then, while the dry film to be the color filters 56 of the first type is being attached and while the dry film to be the color filters 58 of the second type is being attached, the bubbles produced between the substrate and the dry film can be dissipated away through those openings. Hereinafter, a color filter substrate in which the first, second and third types of color filters are all made of respective dry films and in which openings are provided between the edges of the areas in which the color filters of each type will be provided and the second edge 52 will be described.

FIG. 8 is a partial plan view of a color filter substrate 80 according to a second specific preferred embodiment of the present invention. In FIG. 8, each member having substantially the same function as the counterpart of the color filter substrate 50 of the first preferred embodiment described above is identified by the same reference numeral and the description thereof will be omitted herein.

In the preferred embodiment illustrated in FIG. 8, the portion of the opaque layer in the non-effective-display area preferably has openings 82 between the areas in which the first type of color filters 56 will be provided and the second edge 52, openings 84 between the areas in which the second type of color filters 58 will be provided and the second edge 52, and openings 86 between the areas in which the third type of color filters 60 will be provided and the second edge 52, respectively. These openings 82, 84 and 86 are closed with dummy color filters 60α, which are made of a dry film to be the color filters 60 of the third type. The third type of color filters 60 are preferably blue color filters rather than red or green color filters. As already described for the first preferred embodiment, a blue color filter can shield light better than a red color filter or a green color filter and can minimize the leakage of light through the opening most effectively. The third type of color filters 60 and the dummy color filters 60α in the openings 86 are preferably combined together.

Hereinafter, an exemplary method for fabricating the color filter substrate 80 will be described with reference to FIGS. 2A through 2E and 9. The first, second and third types of color filters and opaque layer 68 may preferably be made of respective dry films.

As in the first preferred embodiment described above, first, before the color filter layer 62 is formed, the opaque layer 68 is preferably formed as shown in FIGS. 2A and 2B. In this process step, the opaque portions of the first type 64 are preferably made such that openings for the color filters of the first, second and third types are defined in respective areas for the first, second and third types of color filters 56, 58 and 60 as shown in FIG. 8 and the opaque portion of the second type 66 is preferably made such that the openings 82, 84 and 86 are defined continuously with the openings for the color filters of the first, second and third types, respectively.

After the opaque layer 68 has been formed in this manner, the color filter layer 62 may be formed in the following manner, for example. First, a dry film for the first type of color filters 56 is preferably attached onto, and rolled on by the roller 34 against, the transparent substrate 14, and then the film supporting member is preferably peeled off, thereby transferring a photosensitive resin layer for the first type of color filters 56 (i.e., the first colored layer) onto the substrate 14. In this preferred embodiment, the opaque layer 68 has the openings 82 that are combined with the openings for the color filters of the first type. Thus, no edges 56β of the openings for the color filters of the first type are adjacent to any opaque portion in the effective display area. Accordingly, even if any bubbles have been produced between the dry film and the transparent substrate 14, none of those bubbles will remain in the effective display area.

Subsequently, the first colored layer is preferably exposed to a radiation through a mask and then developed, thereby removing excessive portions of the first colored layer and leaving the other portions of the first colored layer within the openings for the color filters 56 of the first type in the effective display area. In the non-effective-display area on the other hand, excessive portions of the first colored layer are preferably removed from inside of the openings 82. The photosensitive resin layer that has closed the openings 82 is removed in this manner. Accordingly, even if any bubbles remain between the openings 82 on the substrate 14 and the dry film, those bubbles can also be dissipated away.

In this manner, the color filters 56 of the first type can be obtained as shown in FIG. 2C.

Next, the color filters 58 of the second type are also made by the same technique as that used for making the color filters 56 of the first type. As in the process step of making the first type of color filters 56, no bubbles will remain between the color filters and the substrate 14, either, in this process step of making the second type of color filters 58.

Figure 9:
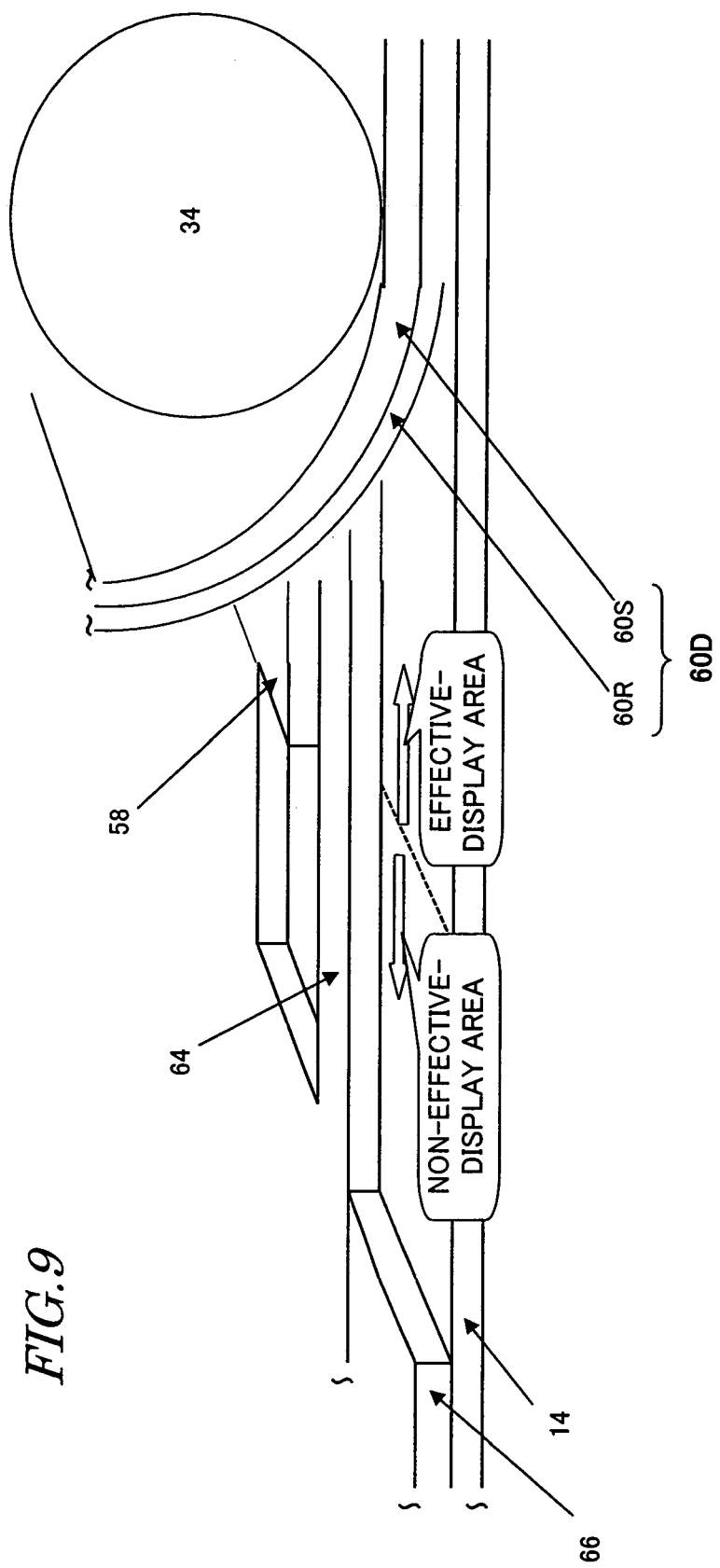
FIG. 9 is a perspective view showing the process step of making a third type of color filters 60.

After the first and second types of color filters 56 and 58 have been formed, the third type of color filters 60 are preferably made. Hereinafter, the process step of making the color filters 60 of the third type will be described in detail with reference to FIG. 9. The cross section shown in FIG. 9 is taken along the line IX-IX shown in FIG. 8 and viewed in the direction indicated by the arrow 71 shown in FIG. 8.

A dry film 60D for the third type of color filters 60 is preferably attached onto, and rolled on by the roller 34 (see FIG. 9) against, the transparent substrate 14, and then the film supporting member 60S is preferably peeled off, thereby transferring a photosensitive resin layer 60R for the third type of color filters 60 (i.e., the third colored layer) onto the substrate 14. Thereafter, the third colored layer is preferably exposed to a radiation through a mask and then developed, thereby removing excessive portions of the third colored layer from over the opaque portions of the first type 64, first type of color filters 56 and second type of color filters 58 in the effective display area and from over the opaque portion of the second type 66 in the non-effective-display area.

In the non-effective-display area, the opaque layer 68 preferably includes the openings 86 between the areas in which the color filters 60 of the third type will be provided and the second edge 52 of the transparent substrate 14. Accordingly, even if bubbles have been produced between the dry film 60D being attached to make the color filters 60 of the third type and the substrate 14, those bubbles can be dissipated away through the openings 86 as shown in FIG. 9. It should be noted that even if the bubbles could not leave, but remain in, the openings 86, no defects should be caused because the openings 86 are provided in the non-effective-display area.

In this manner, the third type of color filters 60 are obtained, the third colored layer closes the openings 82, 84 and 86, and a dummy color filter 60α is also made. Thereafter, the assembly is subjected to predetermined process steps to complete the color filter substrate 80.

In the second preferred embodiment described above, the opaque layer 68 preferably has the openings 82, 84 and 86 that are adjacent to the areas where the first type of color filters 56 will be provided, the areas where the second type of color filters 58 will be provided, and the areas where the third type of color filters 60 will be provided, respectively. However, the present invention is in no way limited to this specific preferred embodiment. Alternatively, the opaque layer 68 may also include the boundary portions 66A between the edge 56β of the areas in which the first type of color filters 56 will be provided and the second edge 52, between the edge 58β of the areas in which the second type of color filters 58 will be provided and the second edge 52, and between the edge 60β of the areas in which the third type of color filters 60 will be provided and the second edge 52, respectively, as shown in FIG. 1. And the opaque layer 68 may have the openings 82, 84 and 86 between the boundary portions 66A and the second edge 52.

Also, in the second preferred embodiment described above, the openings 82, 84 and 86 are preferably provided for the second opaque portion of the opaque layer 68 between the areas in which the first type of color filters 56 will be provided and the second edge 52, between the areas in which the second type of color filters 58 will be provided and the second edge 52, and between the areas in which the third type of color filters 60 will be provided and the second edge 52, respectively. However, the present invention is in no way limited to this specific preferred embodiment. Particularly when the first, second and third types of color filters 56, 58 and 60 are all made of respective dry films, those openings are preferably provided between the edges of the respective areas in which the first, second and third types of color filters 56, 58 and 60 will be provided and the second edge 52 as in the preferred embodiment described above. However, only the openings 82 or 84 may be provided either between the areas in which the first type of color filters 56 will be provided and the second edge 52 or between the areas in which the second type of color filters 58 will be provided and the second edge 52. In that case, however, the openings 84 are preferably provided between the areas in which the second type of color filters 58 will be provided and the second edge 52 because the second type of color filters 58 are made after the first type of color filters 56 have been provided.

It should be noted, however, that the structure of a color filter substrate according to another preferred embodiment of the present invention may be different from that of the color filter substrate of the second preferred embodiment described above.

Figure 10A:
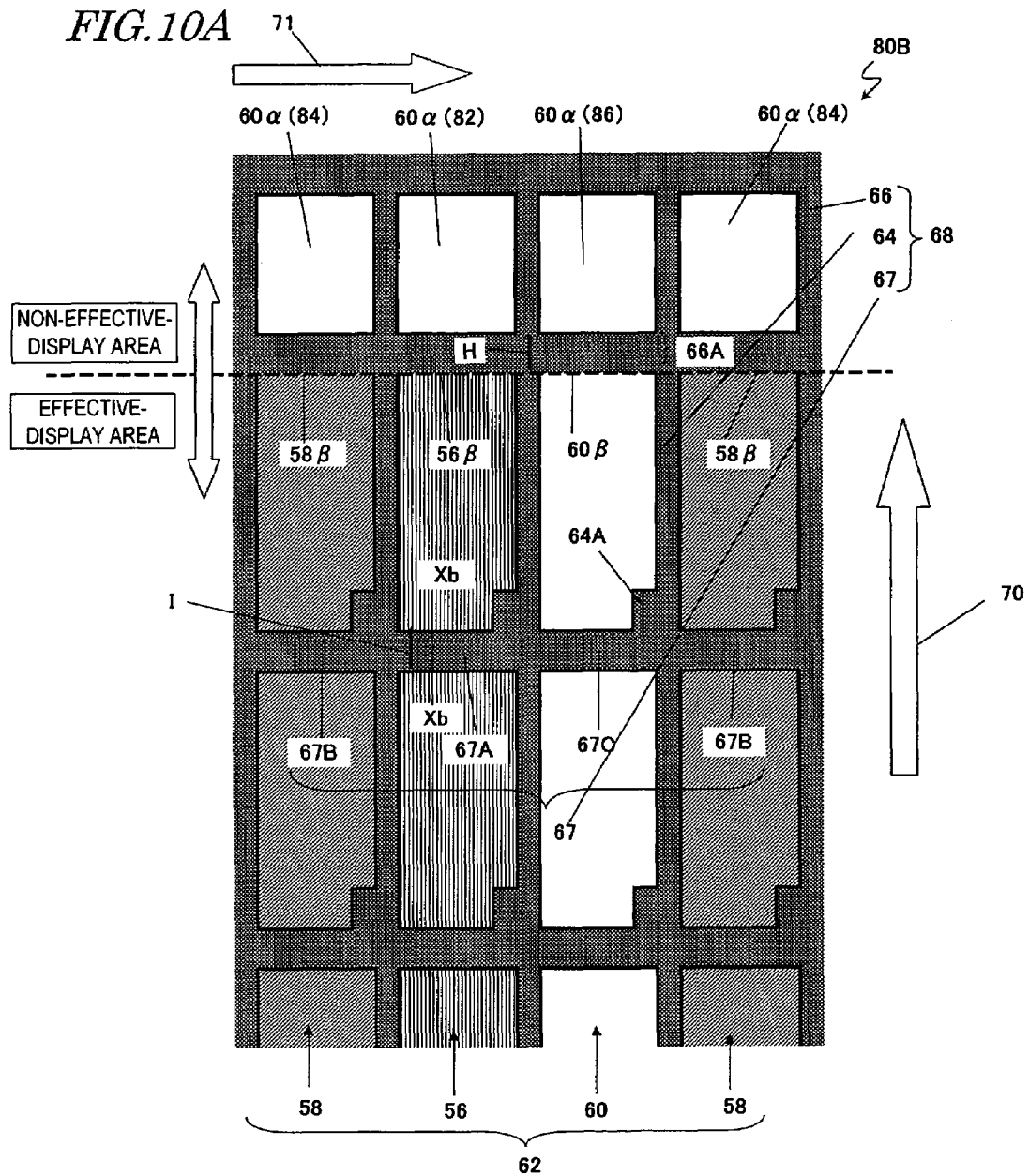
FIG. 10A is a partial plan view of a color filter substrate 80B according to a modified example of the second preferred embodiment of the present invention.

For example, as in the color filter substrate 80B shown in FIG. 10A, the opaque layer 68 may further include opaque portions of a third type 67, each of which connects together two adjacent ones of the opaque portions of the first type 64. The structure and function of the opaque layer 68 with the opaque portions of the third type 67 are substantially the same as those of the opaque layer 68 of the color filter substrate 50B shown in FIG. 6A and the description thereof will be omitted herein. These additional opaque portions of the third type 67 can significantly reduce the amount of light leaking between the gate bus lines 11 and the transparent pixel electrodes 12, thus minimizing the unwanted deterioration in the display quality of the display device.

Figure 10B:
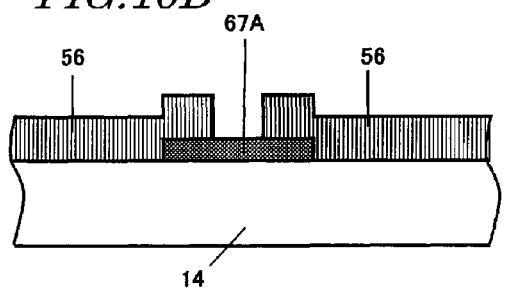
FIG. 10B is a cross-sectional view of the color filter substrate 80B as viewed along the plane Xb-Xb shown in FIG. 10A.
Figure 10C:
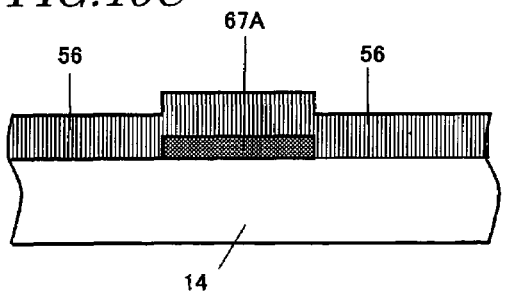
FIG. 10C is a cross-sectional view of an alternative color filter substrate when viewed along the plane Xb-Xb shown in FIG. 10A.
Figure 11:
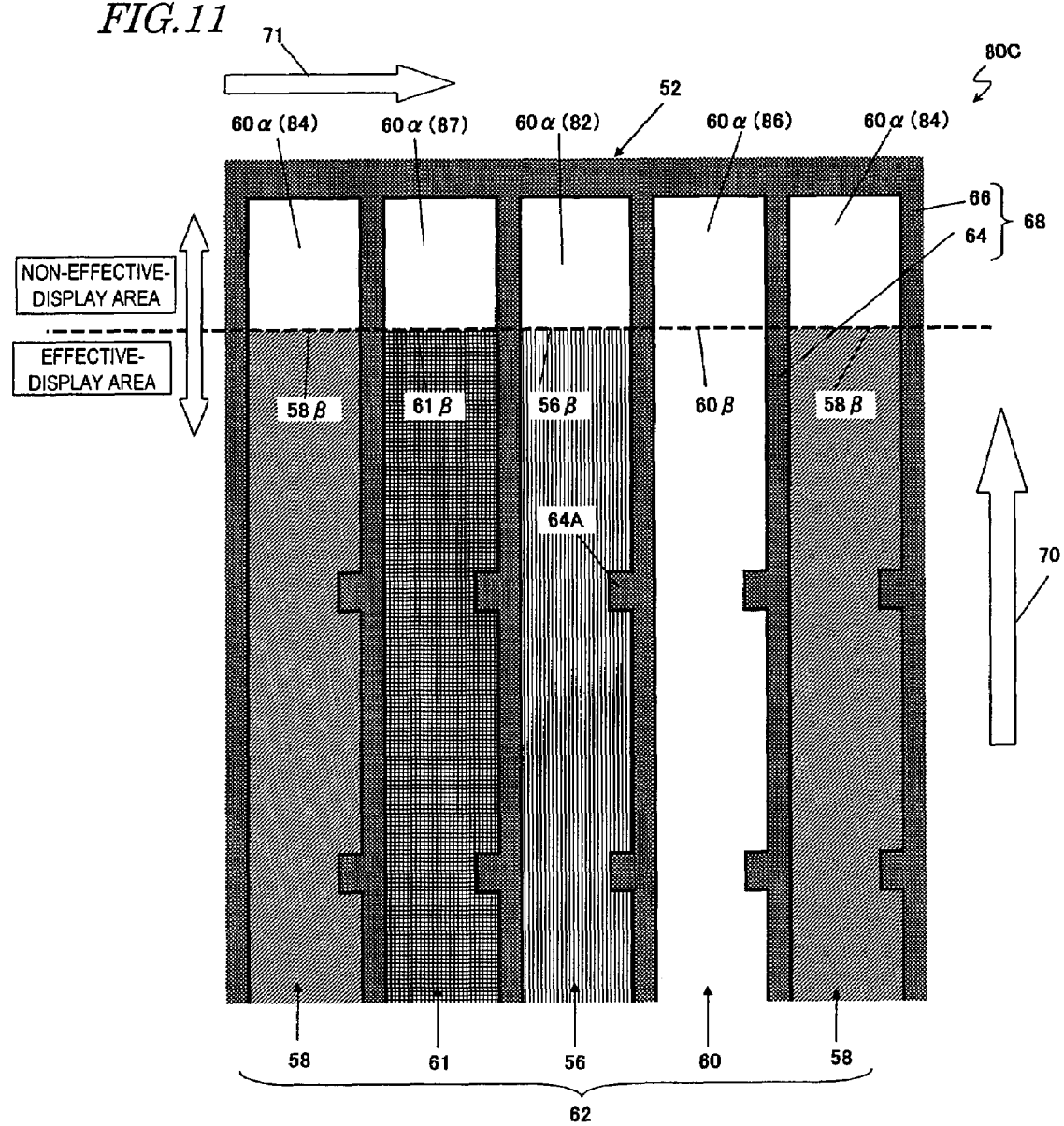
FIG. 11 is a partial plan view of a color filter substrate 80C according to another modified example of the second preferred embodiment of the present invention.

As in the color filter substrate 50B of the first preferred embodiment described above, the color filter layer 62 of the color filter substrate 80B may also include the first type of color filters 56, second type of color filters 58 and third type of color filters 60, which are arranged and divided for respective pixels in the first direction 70 as shown in FIG. 10B. Alternatively, the color filter layer 62 may also include the first, second and third types of color filters 56, 58 and 60, each of which preferably extends as a stripe in the first direction 70 as shown in FIG. 10C.

Furthermore, just like the color filter substrate 50C of the first preferred embodiment shown in FIG. 7, the color filter substrate of this second preferred embodiment may also include a color filter layer having color filters of four or more colors. The structure and function of such a color filter layer including color filters of four or more colors are substantially the same as those of the color filter layer of the color filter substrate 50C described above, and the description thereof will be omitted herein.

An active-matrix-addressed LCD can be fabricated by combining the color filter substrate of the first or second preferred embodiments of the present invention described above with an active-matrix substrate and providing a liquid crystal layer between the two substrates. Hereinafter, an active-matrix substrate for use in such an active-matrix-addressed LCD will be described.

In the color filter substrate 80 of the second preferred embodiment, the opaque layer 68 preferably has the openings 82, 84 and 86 between the respective edges of the areas in which the first, second and third types of color filters 56, 58 and 60 will be provided and the second edge 52 and those openings 82, 84 and 86 are preferably covered with the blue dummy color filters 60α. In such a color filter substrate 80, the display quality may be deteriorated by the dummy color filters 60α. However, if a display device is fabricated by combining this color filter substrate 80 with the active-matrix substrate 2A to be described below, such deterioration in display quality can be minimized effectively.

Figure 12:
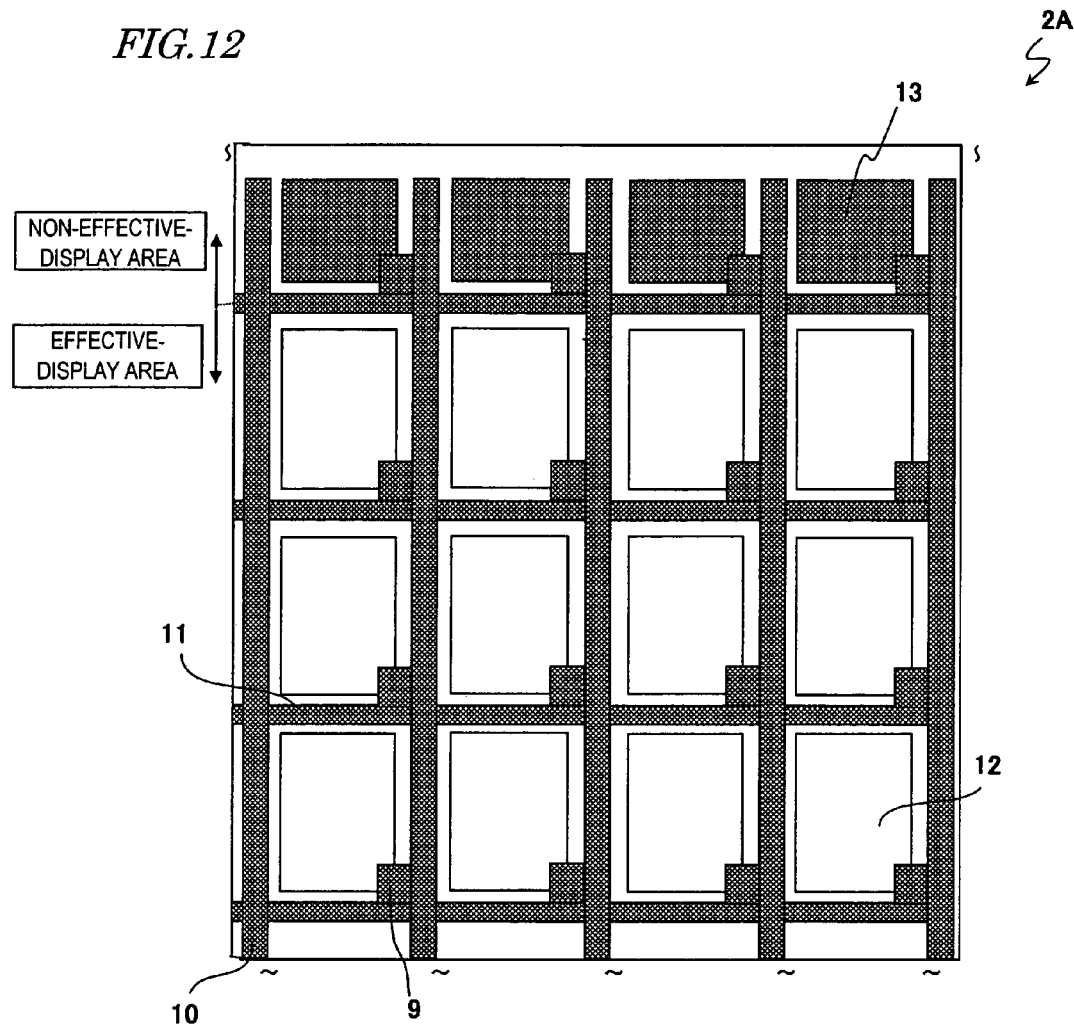
FIG. 12 is a partial plan view of an active-matrix substrate.

It should be noted that if a display device is fabricated by opposing an active-matrix substrate to the color filter substrate shown in FIG. 8, then the active-matrix substrate 2A shown in FIG. 12 is preferably turned over such that the right side is shifted to the left side and vice versa.

As shown in FIG. 12, the active-matrix substrate 2A preferably includes source bus lines 10 extending in a row direction, gate bus lines 11 extending in a column direction, switching elements (e.g., TFTs) 9, each being provided near an intersection between its associated source and gate bus lines 10 and 11, and transparent pixel electrodes 12 (made of ITO, for example) connected to the respective switching elements 9. The source bus lines 10, gate bus lines 11, switching elements 9 and pixel electrodes 12 are preferably all provided on a transparent insulating substrate 8 of glass, for example. The transparent pixel electrodes 12 are preferably arranged in a matrix so as to define pixels as display area units.

If a display device is fabricated by opposing the color filter substrate to the active-matrix substrate, then each column of transparent pixel electrodes 12 will face the first, second or third type of color filter 56, 58 or 60 on the color filter substrate.

The active-matrix substrate 2A preferably further includes dummy pixel electrodes 13, which are preferably arranged in the non-effective-display area and which may be made of the same metal layer as the source bus lines 10, for example. Accordingly, the dummy pixel electrodes 13 have light blocking property. If a display device is fabricated by opposing the active-matrix substrate 2A against the color filter substrate, the dummy pixel electrode 13 are preferably arranged so as to face the openings (and dummy color filters) in the portion of the opaque layer in the non-effective-display area of the color filter substrate. Portions of the liquid crystal layer, which are located over the respective dummy pixel electrodes 13, are preferably controlled so as to always exhibit a black display state. Then, the dummy pixel electrodes 13 can exhibit improved light blocking property. Also, if those portions of the liquid crystal layer over the respective dummy pixel electrodes 13 are controlled so as to always exhibit the black display state, then unwanted leakage of light from the dummy pixel electrodes 13 can be minimized even when the dummy pixel electrodes 13 and the transparent pixel electrodes 12 in the effective display area are made of the same ITO layer, for example.

If a display device is fabricated by combining this active-matrix substrate 2A with the color filter substrate 80 shown in FIG. 8, for example, then a bluish image, which may be perceived as such in the picture frame area due to the presence of the blue dummy color filters 60α there, can be eliminated effectively.

A color filter substrate according to any of various preferred embodiments of the present invention described above is effectively applicable for use in not just active-matrix-addressed LCDs but also various other types of color display devices that have any display medium layer other than the liquid crystal layer (e.g., an electrophoretic layer).

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2002-381210 filed on Dec. 27, 2002, No. 2003-18932 filed on Jan. 28, 2003, and No. 2003-384206 filed on Nov. 13, 2003, the entire contents of which are hereby incorporated by reference.

What is claimed is:

1. A color filter substrate comprising:
a transparent substrate with a first edge and a second edge that are opposed to each other; and
a color filter layer and an opaque layer, both of which are provided on the transparent substrate; wherein
the color filter layer includes at least one color filter of a first type, at least one color filter of a second type and at least one color filter of a third type, all of the color filters of the first, second and third types extend in a first direction from the first edge toward the second edge of the transparent substrate, each said color filter of the third type being provided between an associated pair of the color filters of the first and second types,
the opaque layer includes opaque portions of a first type extending in the first direction and an opaque portion of a second type, which is connected to the opaque portions of the first type and which is provided near and along the second edge, the opaque portions of the first type being provided between the first and third types of color filters and between the third and second types of color filters, and
the opaque layer further includes an opening in a non-effective display area of the color filter substrate between one end of said at least one color filter of the third type and the second edge of the transparent substrate.

2. A display device comprising:
the color filter substrate of claim 1; and
an active-matrix substrate, which is arranged so as to face the color filter substrate with a display medium layer interposed between the color filter substrate and the active-matrix substrate.

3. A color filter substrate comprising:
a transparent substrate with a first edge and a second edge that are opposed to each other; and
a color filter layer and an opaque layer, both of which are provided on the transparent substrate; wherein
the color filter layer includes at least one color filter of a first type, at least one color filter of a second type and at least one color filter of a third type, all of the color filters of the first, second and third types extend in a first direction from the first edge toward the second edge of the transparent substrate, each said color filter of the third type being provided between an associated pair of the color filters of the first and second types,
the opaque layer includes opaque portions of a first type extending in the first direction and an opaque portion of a second type, which is connected to the opaque portions of the first type and which is provided near and along the second edge, the opaque portions of the first type being provided between the first and third types of color filters and between the third and second types of color filters,
the opaque layer further includes a first opening between one end of each said color filter of the first type and the second edge, a second opening between one end of each said color filter of the second type and the second edge, and a third opening between one end of each said color filter of the third type and the second edge, respectively, a first dummy color filter, a second dummy color filter and a third dummy color filter being provided in the first, second and third openings, respectively and
the first dummy filter, the second dummy filter, and the third dummy filter are in a non-effective display area of the color filter substrate.

4. The color filter substrate of claim 3, wherein the at least one color filter of the first type is made of one of a red colored layer and a green colored layer, the at least one color filter of the second type is made of the other of the red and green colored layers, and the at least one color filter of the third type and the first, second and third dummy color filters are made of a blue colored layer.

5. The color filter substrate of claim 3, wherein the color filter layer further includes at least one color filter of a fourth type extending in the first direction, and
   wherein each said color filter of the fourth type is arranged so as to be adjacent to an associated color filter of the first type and so as to be interposed between the color filter of the first type and an associated color filter of the third type, or
   each said color filter of the fourth type is arranged so as to be adjacent to an associated color filter of the second type and so as to be interposed between the color filter of the second type and an associated color filter of the third type, and
   wherein the opaque layer further includes a fourth opening between one end of each said color filter of the fourth type and the second edge, a fourth dummy color filter being provided in the fourth opening.

6. The color filter substrate of claim 5, wherein the at least one color filter of the third type and the first, second and third dummy color filters are made of a blue colored layer, and
   wherein the color filters of the first, second and fourth types are made of layers in mutually different colors and each of the color filters of the first, second and fourth types is made of a red colored layer, a green colored layer or an uncolored transparent layer.

7. The color filter substrate of claim 3, wherein the opaque layer further includes opaque portions of a third type, each connecting together an associated pair of adjacent ones of the opaque portions of the first type, and
   wherein each of the opaque portions of the third type has a width which is greater than about 0 μm but equal to or smaller than about 40 μm as measured in the first direction.

8. The color filter substrate of claim 7, wherein each said color filter of the first type includes a plurality of filter portions of the first type, each said color filter of the second type includes a plurality of filter portions of the second type, and each said color filter of the third type includes a plurality of filter portions of the third type, and
   wherein a gap between two adjacent ones of the filter portions of the first type, a gap between two adjacent ones of the filter portions of the second type, and a gap between two adjacent ones of the filter portions of the third type are defined over the opaque portions of the third type.

9. The color filter substrate of claim 7, wherein each said color filter of the first type includes a plurality of filter portions of the first type, each said color filter of the second type includes a plurality of filter portions of the second type, each said color filter of the third type includes a plurality of filter portions of the third type, and each said color filter of the fourth type includes a plurality of filter portions of the fourth type,
   wherein a gap between two adjacent ones of the filter portions of the first type, a gap between two adjacent ones of the filter portions of the second type, a gap between two adjacent ones of the filter portions of the third type and a gap between two adjacent ones of the filter portions of the fourth type are defined over the opaque portions of the third type.

10. A display device comprising:
    the color filter substrate of claim 3; and
    an active-matrix substrate, which is arranged so as to face the color filter substrate with a display medium layer interposed between the color filter substrate and the active-matrix substrate; wherein
    the active-matrix substrate includes:
    a plurality of pixel electrodes, which are arranged in a matrix on the active-matrix substrate and extending in the first direction and in a second direction which is substantial perpendicular to the first direction, so as to face the at least one color filter of the first type, the at least one color filter of the second type and the at least one color filter of the third type; and
    a first dummy pixel electrode, a second dummy pixel electrode and a third dummy pixel electrode, which are arranged so as to face the first, second and third openings, respectively, and all of which are made of a metal layer.

11. A display device comprising:
    the color filter substrate of claim 3; and
    an active-matrix substrate, which is arranged so as to face the color filter substrate with a display medium layer interposed between the color filter substrate and the active-matrix substrate; wherein
    the active-matrix substrate includes:
    a plurality of pixel electrodes, which are arranged in a matrix on the active-matrix substrate extending in the first direction and in a second direction which is substantially perpendicular to the first direction, so as to face the at least one color filter of the first type, the at least one color filter of the second type and the at least one color filter of the third type; and
    a first dummy pixel electrode, a second dummy pixel electrode and a third dummy pixel electrode, which are arranged so as to face the first, second and third openings, respectively, and
    wherein the display medium layer on the first, second and third dummy pixel electrodes is controlled so as to exhibit a black display state.

* * * * *